July 28, 1931.  A. P. STEINER ET AL  1,816,750
CRANK GRINDING MACHINE
Filed Aug. 2, 1926   21 Sheets-Sheet 1

INVENTORS.
Amos P. Steiner
Paul Stoner.
C. P. Harrison.
BY
ATTORNEY.

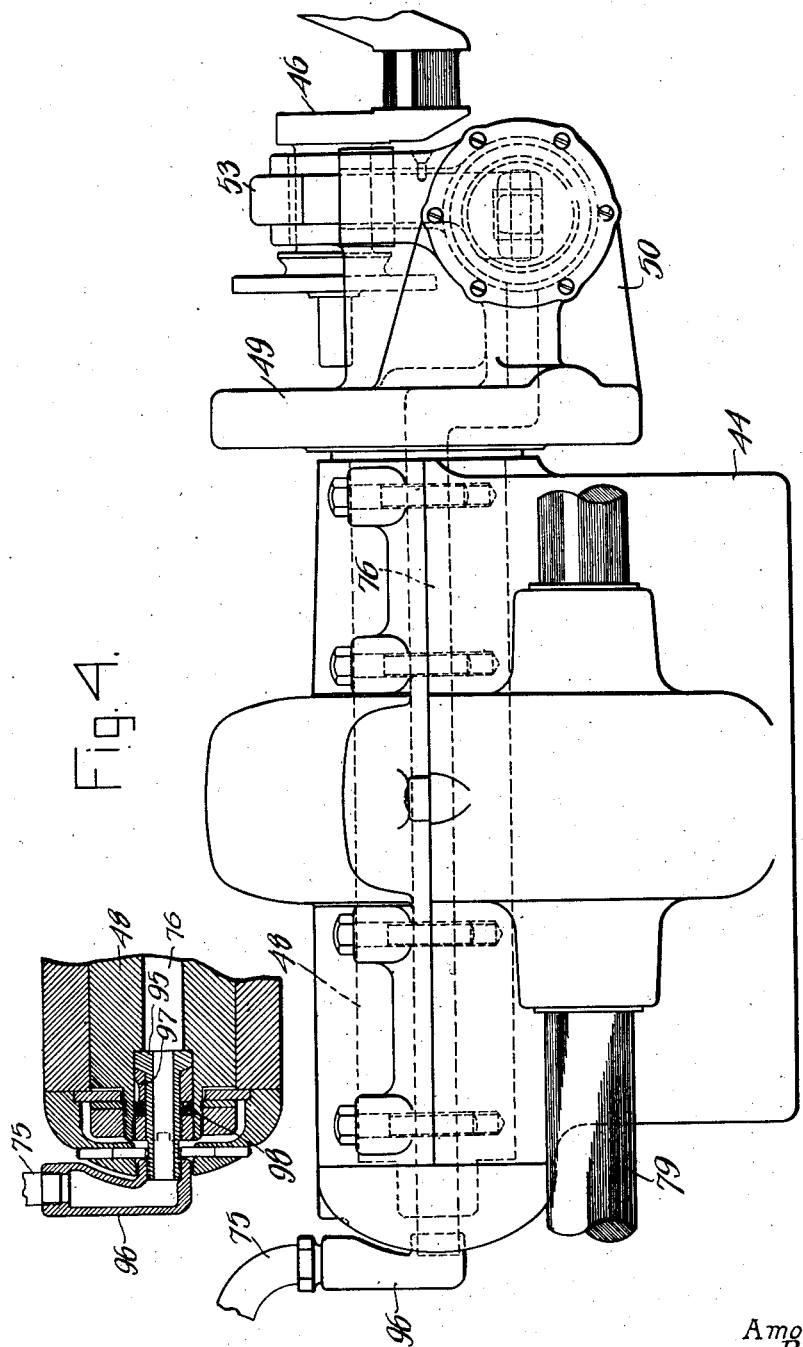

July 28, 1931.  A. P. STEINER ET AL  1,816,750
CRANK GRINDING MACHINE
Filed Aug. 2, 1926  21 Sheets-Sheet 4
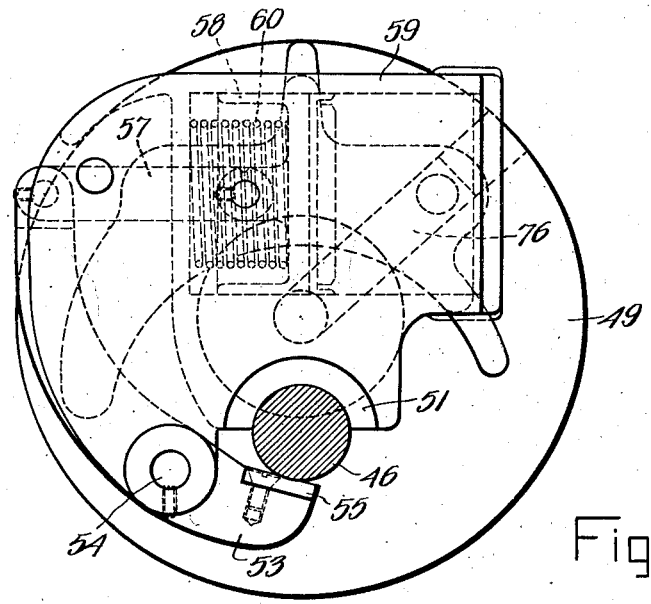
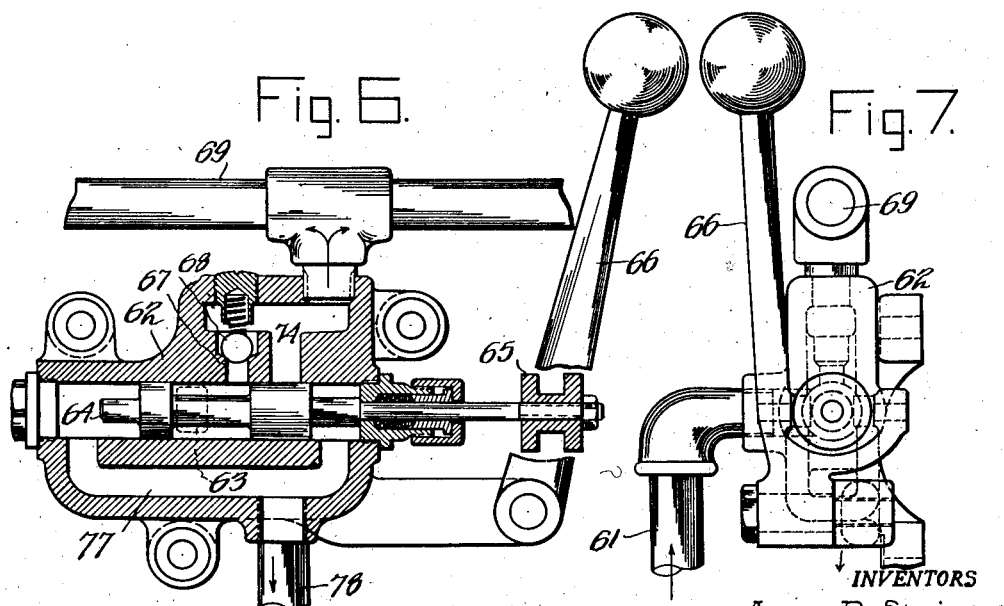
INVENTORS
Amos P. Steiner.
Paul Stoner
C. P. Harrison
BY
ATTORNEY.

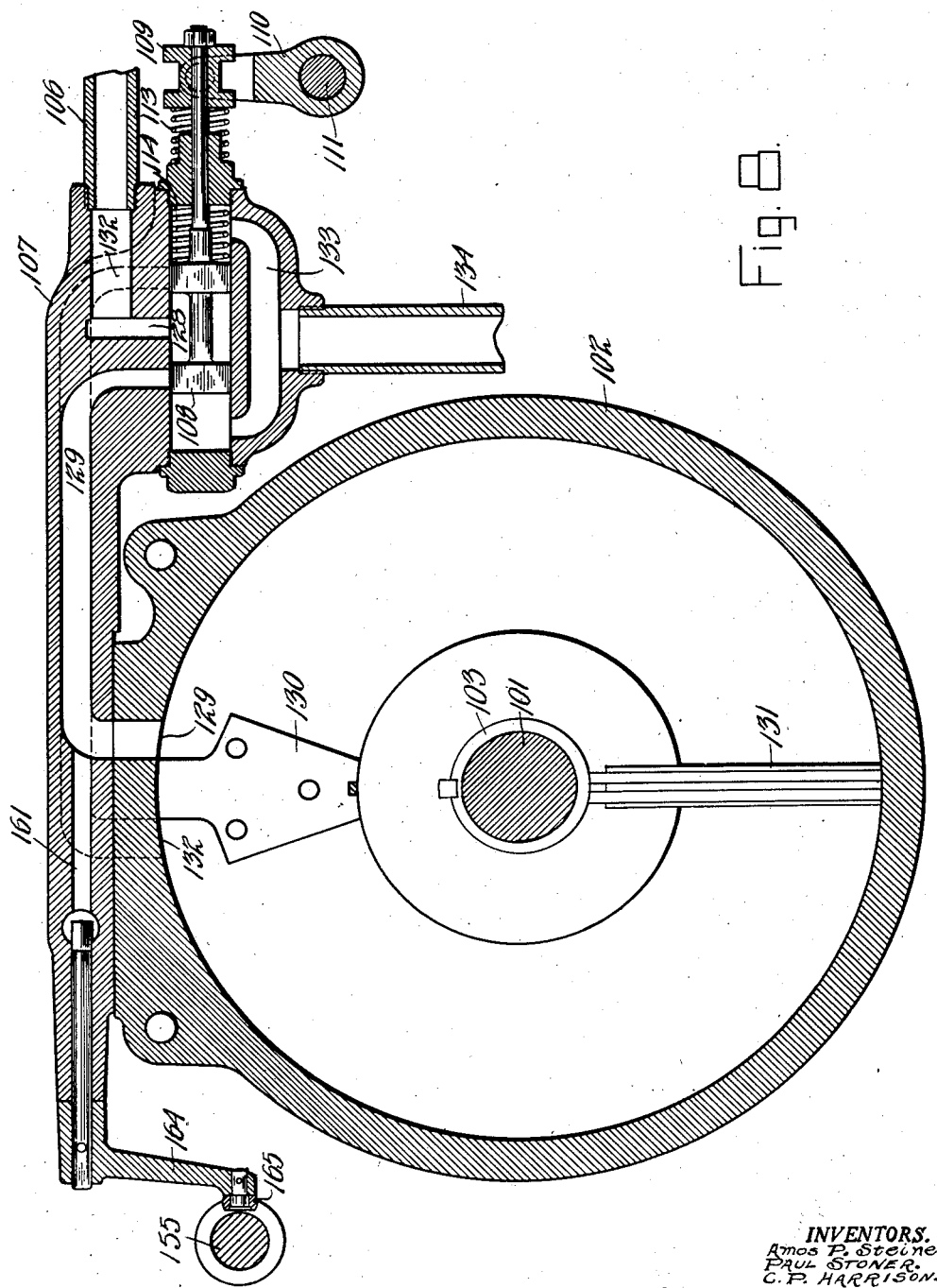

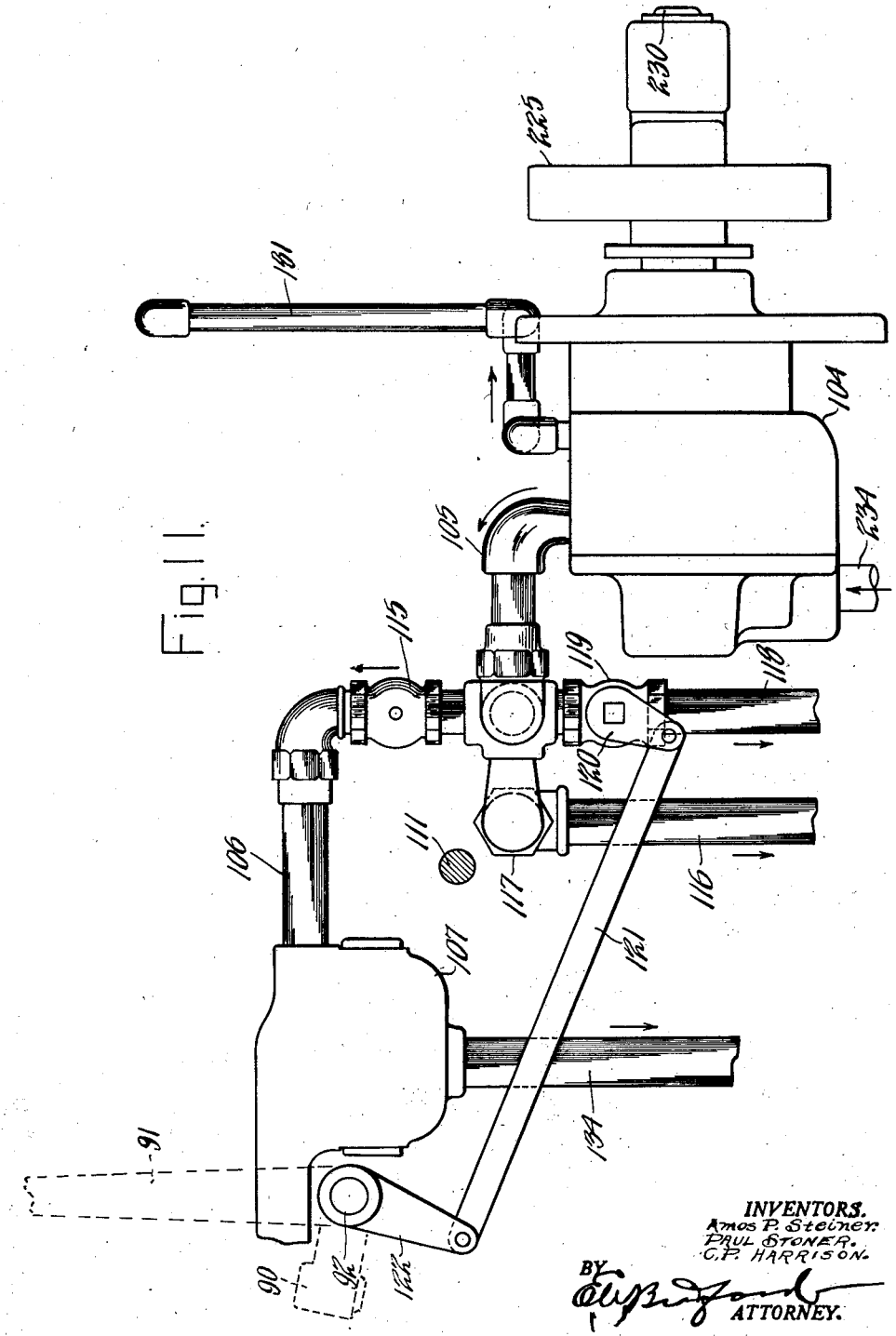

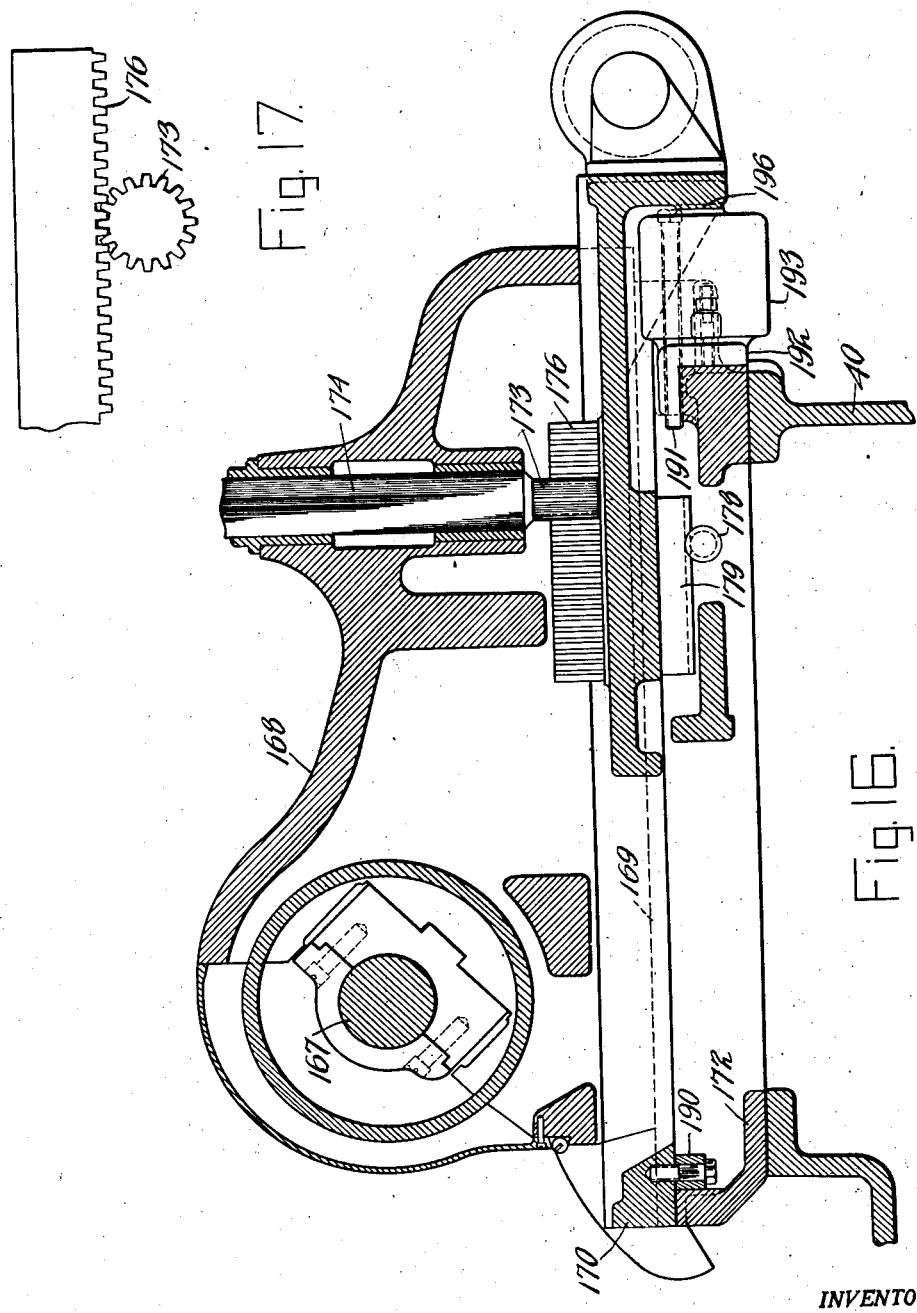

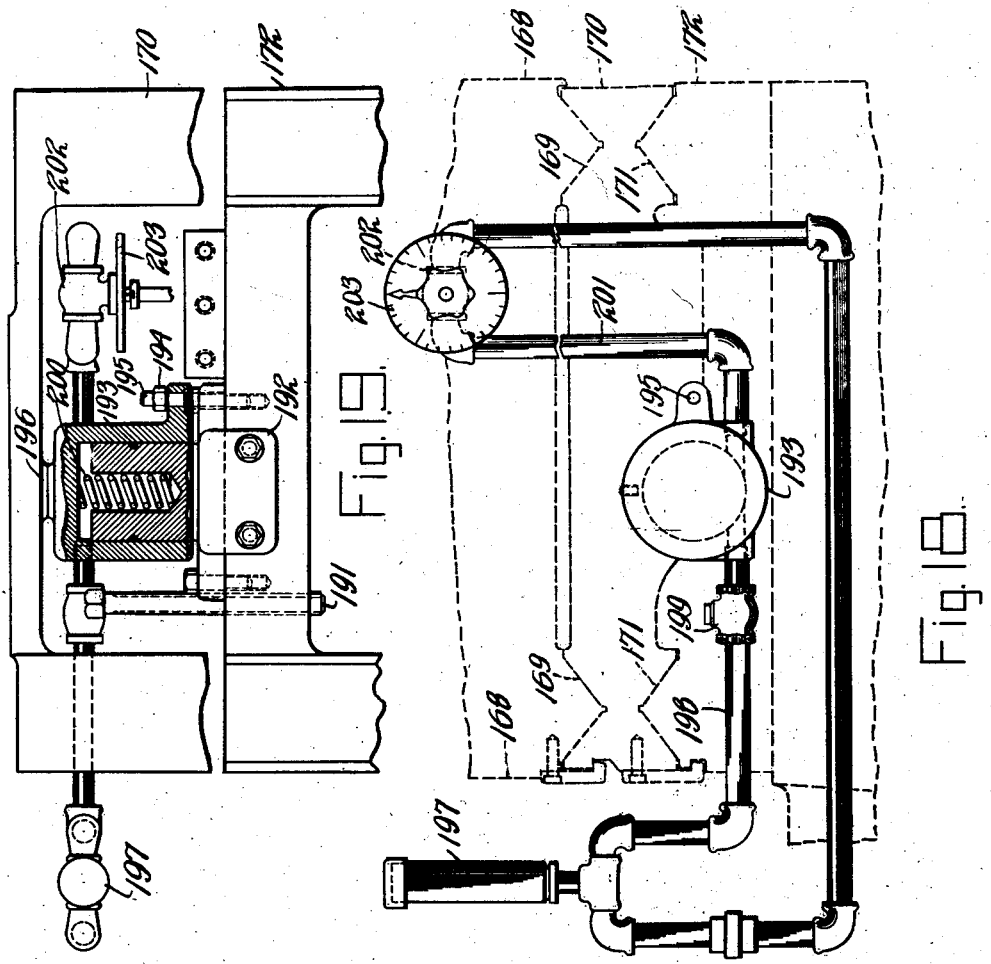

July 28, 1931.  A. P. STEINER ET AL  1,816,750
CRANK GRINDING MACHINE
Filed Aug. 2, 1926   21 Sheets-Sheet 13
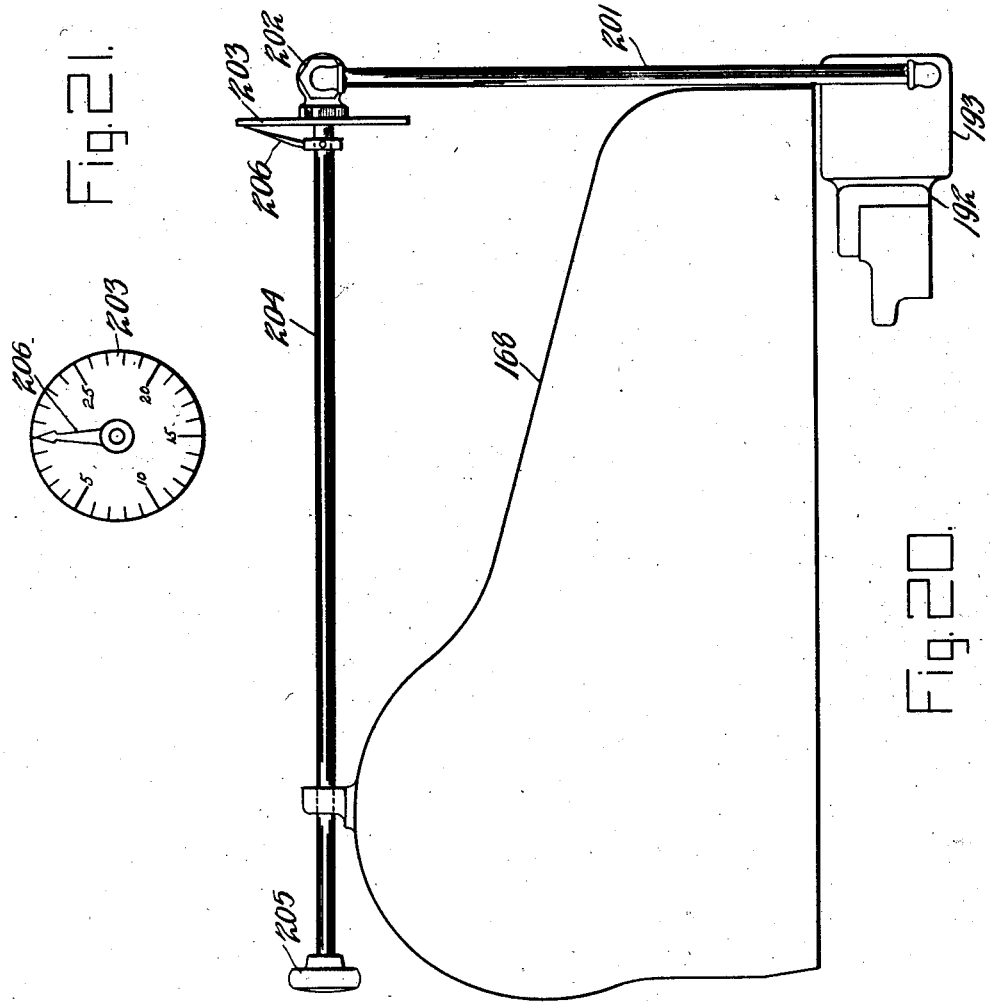
INVENTORS
Amos P. Steiner.
Paul Stoner
BY  C. P. Harrison
ATTORNEY.

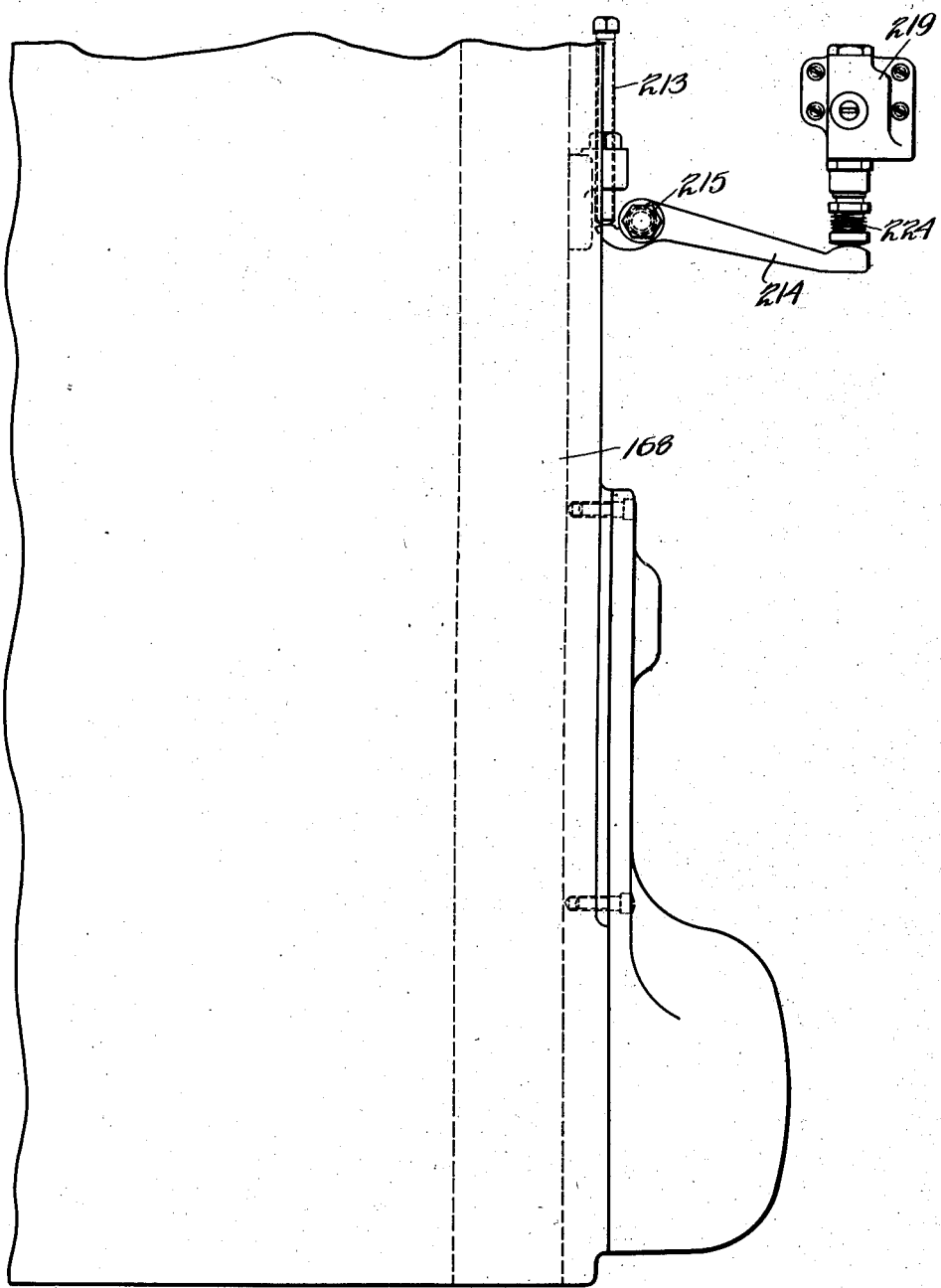

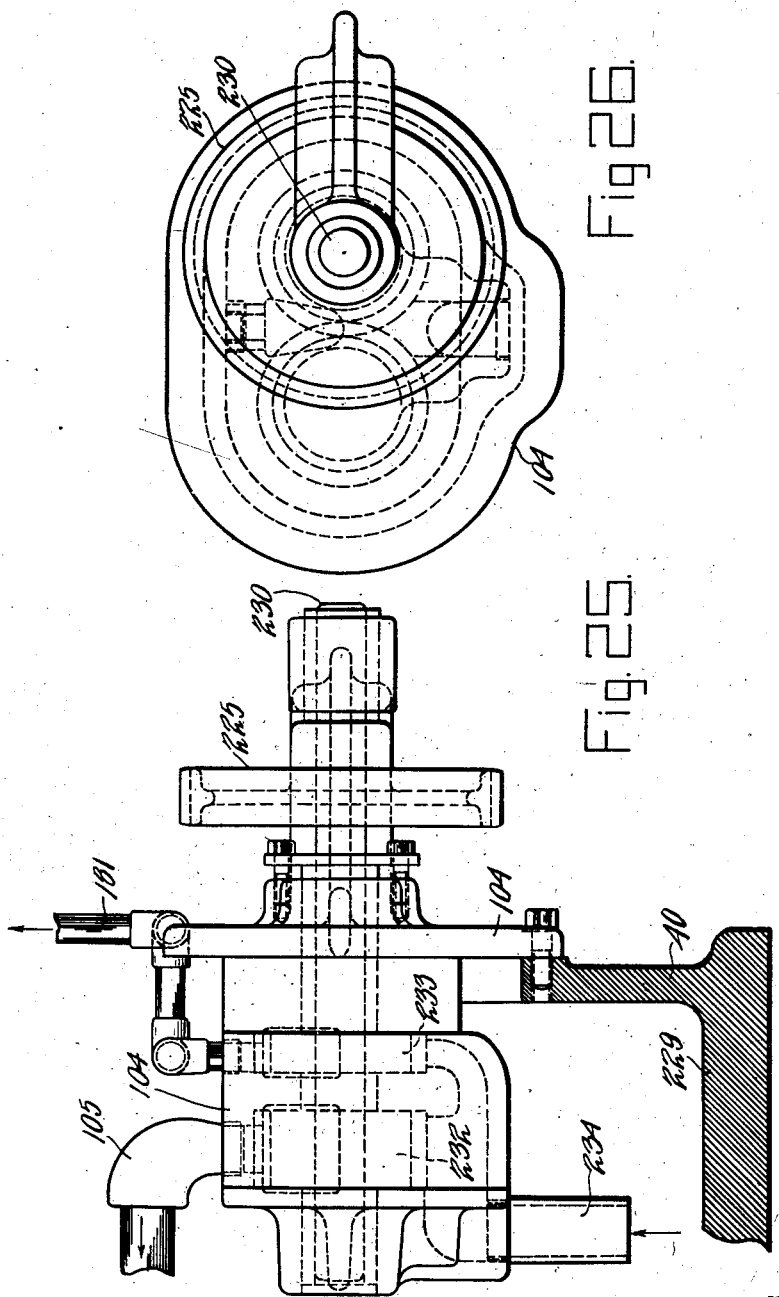

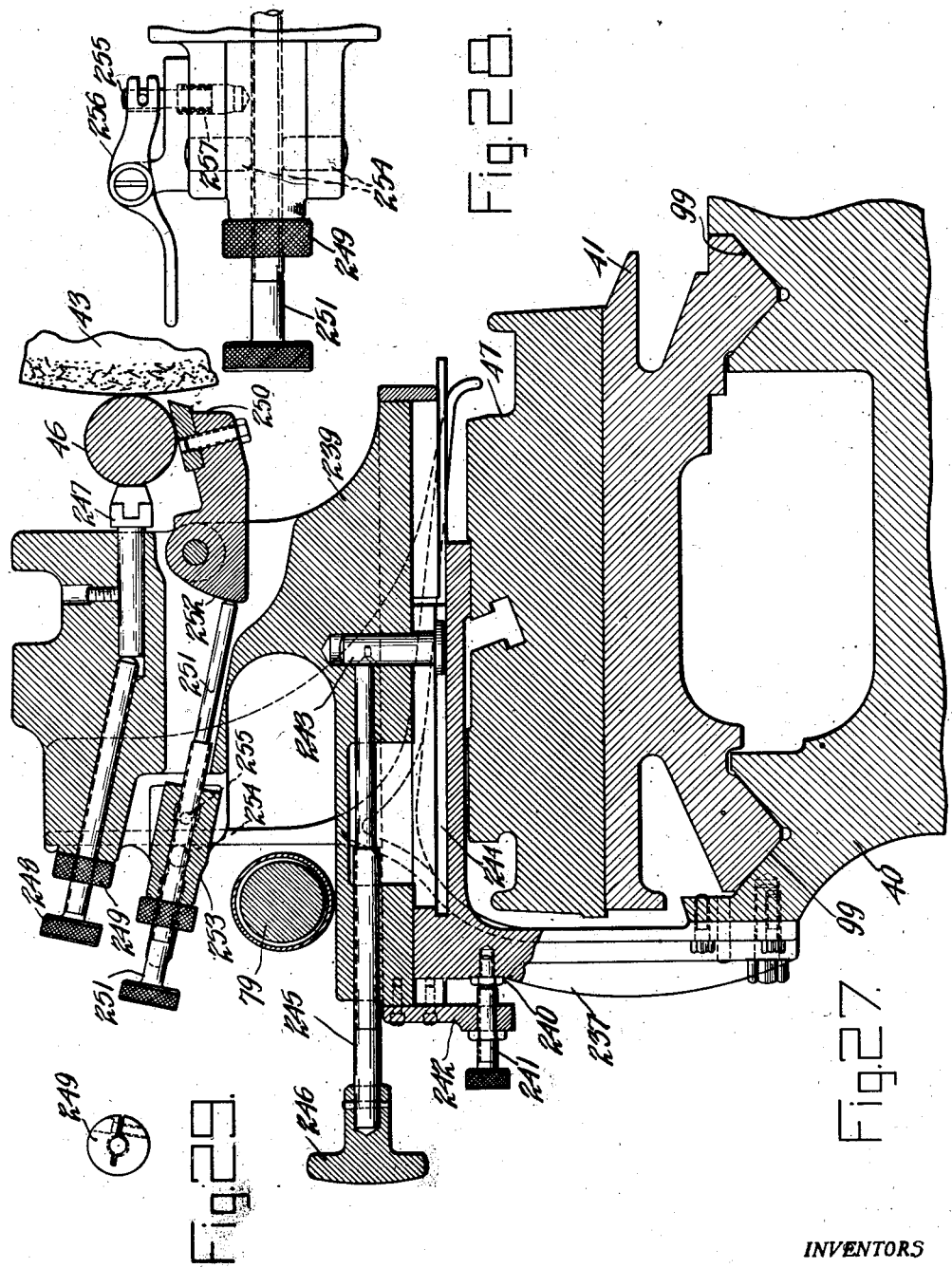

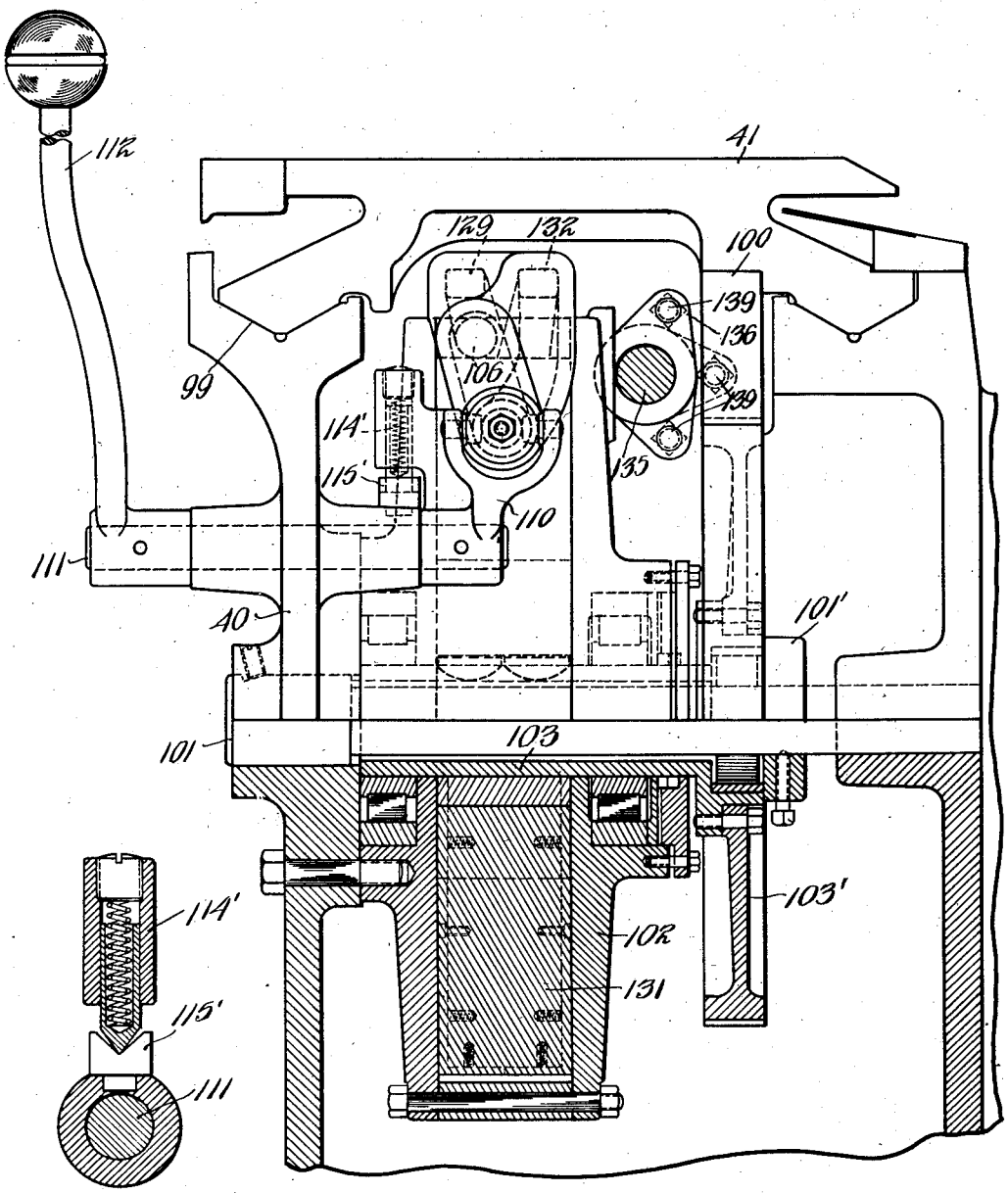

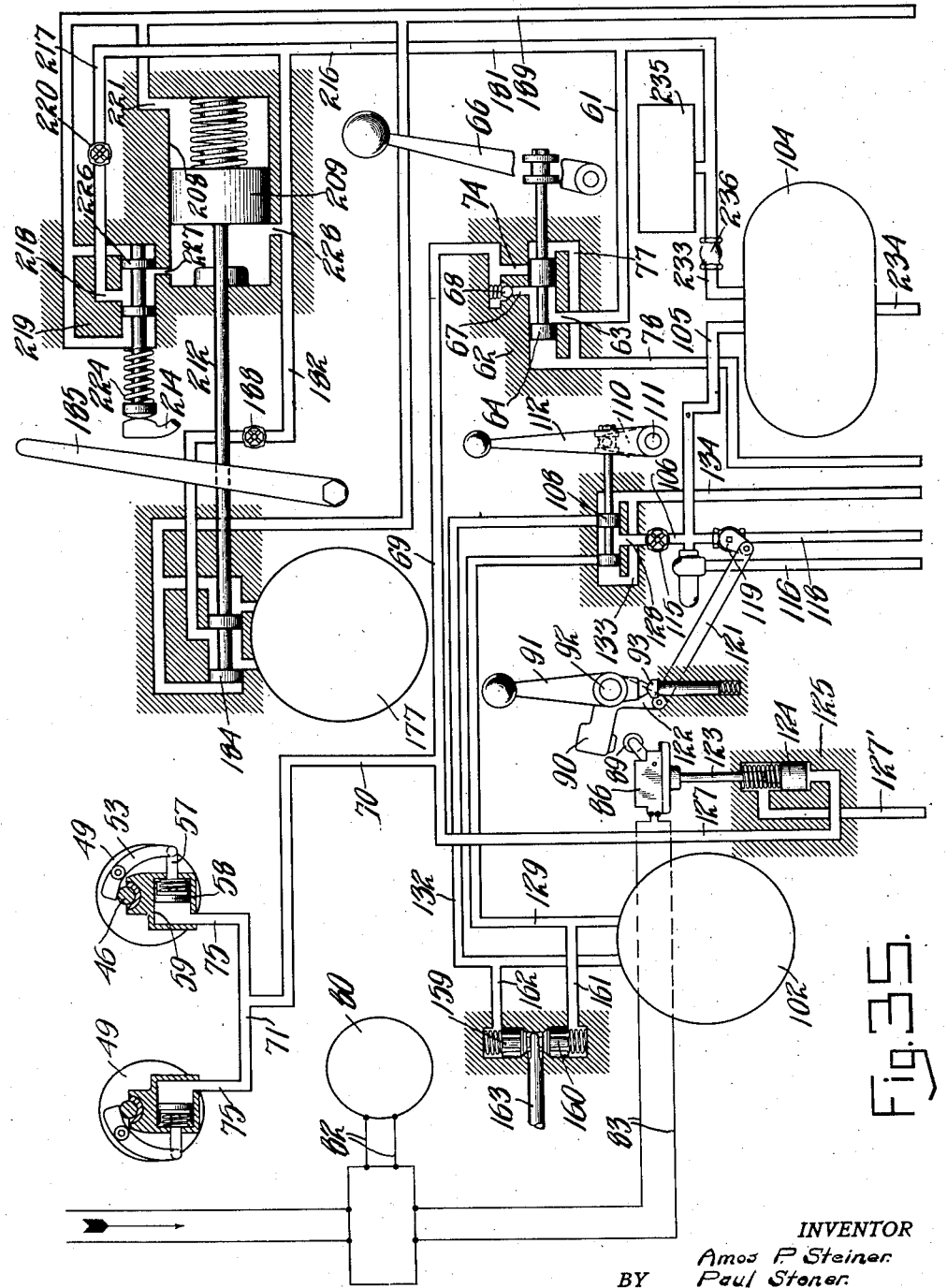

Patented July 28, 1931

1,816,750

UNITED STATES PATENT OFFICE

AMOS P. STEINER, PAUL STONER, AND CHARLES P. HARRISON, OF WAYNESBORO, PENN-SYLVANIA, ASSIGNORS TO LANDIS TOOL COMPANY, OF WAYNESBORO, PENNSYL-VANIA, A CORPORATION OF PENNSYLVANIA

CRANK GRINDING MACHINE

Application filed August 2, 1926. Serial No. 126,583.

This invention relates to a grinding machine for grinding multiple throw crank shafts, and it is an object of the same to perform hydraulically the major part of the various operations required for grinding all the pins on a crankshaft with the least amount of labor and attention from the operator.

The usual crank grinding machine includes manually operated means for clamping the crank in each head, manually operated means to feed the wheel in for grinding and to retract it upon completion of the grinding operation or prior thereto. In this invention these manual operations are eliminated and hydraulic means substituted which afford a much quicker and easier method of performing such operations. Some other objects of the invention therefore are:

(a) To provide hydraulic means for simultaneously clamping the crankshaft in both crank-heads, and resilient means for releasing the same said means maintaining high pressure on the crank-heads throughout the grinding operation.

(b) To provide simple and accurate means whereby the work carriage is traversed hydraulically to move the crank lengthwise for bringing the grinding wheel into working relation with the cranks in succession, including speed-controlling and stopping means.

(c) To provide connections for traversing the work carriage manually when desired, with interconnected means for relieving the pressure in the traverse motor to allow the carriage to travel without any resistance from the fluid in said motor, and a safety device to prevent accidental starting.

(d) To provide interconnected means for rendering the traverse motor and the crank-head rotating motor alternately inoperative, the work rotating motor is rendered inoperative when the pressure is released from the crank clamping fixtures.

(e) To provide means for traversing the carriage by power from one crank pin to another in the same plane, and controlling means therefor.

(f) To provide wheel feeding means affording a quick retard and advance of the wheel to clear the work when changing cranks and a slow feed for grinding followed by a dwell while the grinding is finished with subsequent retraction of the wheel.

(g) To provide means operable manually for positioning the wheel relatively to the work to compensate for wear of the wheel.

(h) To provide improved pressure pumping means for a grinding machine of the character indicated.

(i) To provide an improved work rest for crank grinding machines.

Referring to the accompanying drawings which are made a part hereof and on which similar reference characters indicate similar parts, Fig. 1 is a front elevation showing the general arrangement of the machine, Fig. 2, a right hand elevation of said machine, Fig. 3, a front elevation of the left hand crank head showing a crank held in the hydraulic clamping device, Fig. 4, a section through the spindle of said head showing the revolving joint to admit fluid pressure from the stationary pipe to the revolving spindle, Fig. 5, an end elevation of the hydraulic crank clamping device when viewed from the right in Figure 3, Fig. 6, a sectional elevation of the operating and locking valve for the crank clamping fixture, Fig. 7, an end elevation of said valve, Fig. 8, a sectional elevation of the hydraulic work carriage traversing motor with the operating valve and by-pass for said motor.

Fig. 9, an enlarged sectional plan of the by-pass valves of the traverse motor, indicated in Figure 10, Fig. 10, a plan view showing the hand wheel and mechanism for manual operation of the carriage traverse, Fig. 11, a partial front elevation of the machine showing the valves and piping of the traverse motor and the fluid pressure pump, Fig. 12, a front elevation, partly in section, of a control lever for starting and stopping the rotation of the work, and a safety device in connection therewith, Fig. 13, a front elevation partly in section showing the general arrangement of the crank spacing device, Fig. 14, a partial plan showing the arrangement of the stops of the crank spacing device, Fig. 15, a fragmentary end elevation of the machine showing the spacing device in position thereon, Fig. 16, a section of the wheel base and wheel slide showing the feeding racks and stops, Fig. 17, an enlarged plan of the rack and pinion for the wheel base, Fig. 18, a front elevation of the wheel feed regulating device and the control therefor, Fig. 19, a plan of said wheel feed regulating device partly in section, Fig. 20, a side elevation of the controlling means for the wheel feed device, Fig. 21, a front view of the indicating dial on the control valve, Fig. 22, a side elevation showing the wheel feed hydraulic motor and parts coacting therewith, Fig. 23, an enlarged section of the control mechanism for the wheel feeding motor, Fig. 24, a partial plan showing the operating means for said control mechanism, Fig. 25, a side elevation of the fluid pressure pump, Fig. 26, an end elevation of said pump viewed from the right, Fig. 27, a transverse section showing details of a work rest, Fig. 28, a plan showing the latch for the lower jaw release, Fig. 29, a front elevation of the adjusting screw stop nuts, Fig. 30, a front elevation of the work rest, Fig. 31, a sectional front elevation of means for centering the valve of the traverse motor, shown in Figure 32, and Fig. 32, a right hand elevation of the traverse motor, partly in section.

Figure 35 is a diagrammatic view showing the relation of the fluid circuits and fluid motors.

Figure 1:
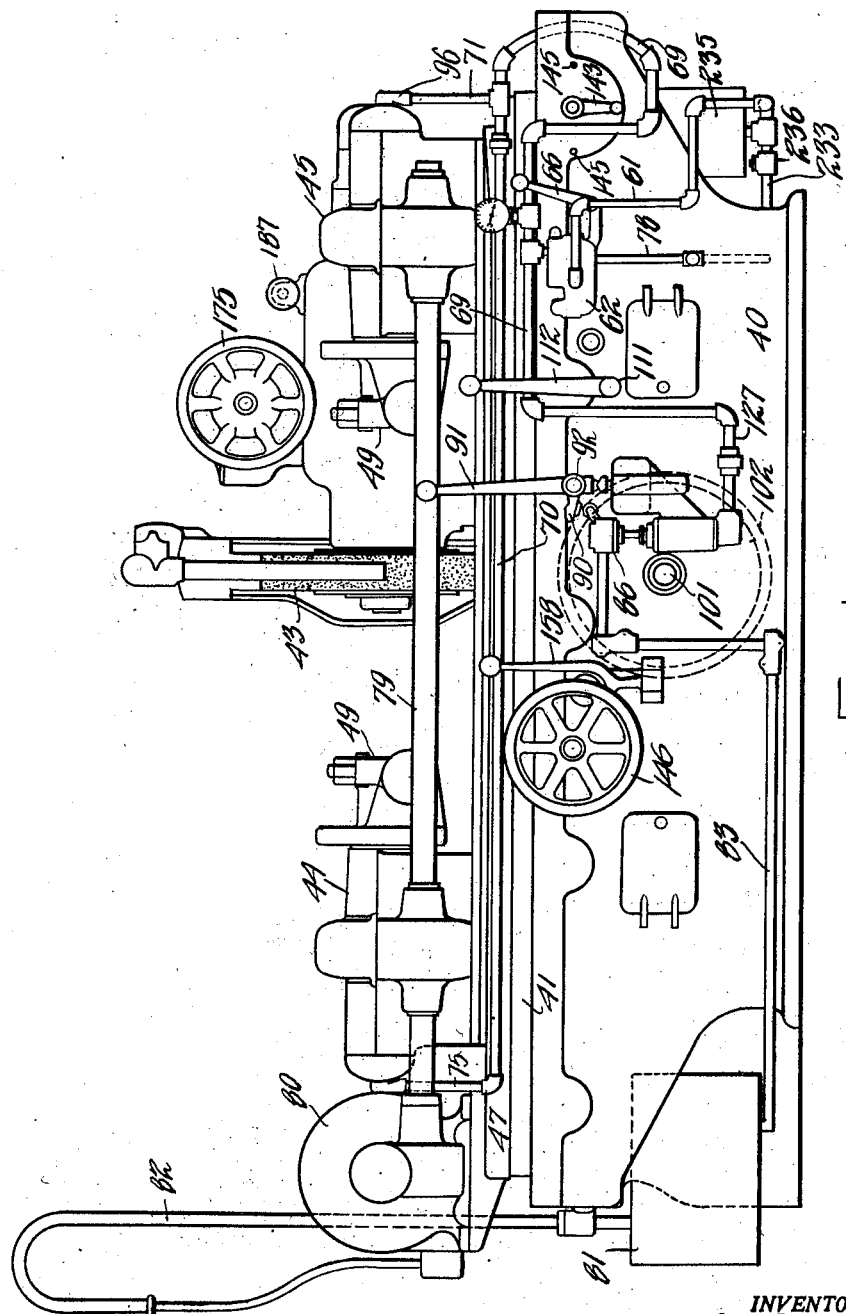

In the drawings reference character 40 (Figs. 1, 2, 16, 27) indicates the body or frame of the machine which may be of conventional or desirable form for supporting the various elements hereinafter described. A work carriage or table at 41 is mounted on suitable guides 99 (Figs. 27 and 1) and is provided with traversing means for reciprocating the carriage to move the work lengthwise of the machine thereby bringing different cranks at appropriate times into the field of action of a grinding wheel 43.

Work rotating means

The reciprocatory work carriage is provided with workholding means comprising a pair of crank-heads 44 and 45 arranged to support means for gripping or clamping the ends of a crankshaft 46. The crank-heads are suitably mounted upon a table 47 (Figs. 1, 2, 27) on the work carriage 41. Each of the crank-heads is provided with a spindle 48 carrying at its inner end a crankshaft supporting fixture 49 (Figs. 3 and 5). The crank fixture includes a projection 50 shaped at 51 to contact with a crank 46 throughout a portion of its circumference. A lever 53 is pivoted at 54 on the projection 50 and is provided at its free end with a wear plate 55 for engagement with the crank 46 to secure it in position. A link 57 is pivotally connected to the other end of the lever and is also pivotally connected to a piston 58 in a cylinder 59 here shown as formed integrally with the projection 50. A spring 60 serves to move the piston in a direction to swing the lever for releasing the crank 46.

Fluid under pressure is supplied to the cylinders 59 for moving the pistons in a direction to clamp the cranks in place by means comprising a pipe 61 (Figs. 1 and 7), communicating with valve bodies 62, one of which is shown in detail in Figures 6 and 7.

The fluid under pressure enters the valve body from pipe 61 by way of a port 63. The valve body is provided with a balanced piston valve 64 mounted for sliding movement to control the operation of the clamping means and the course of the pressure fluid, said valve having a stem with a spool 65 thereon. A hand lever 66 serves to move the valve in one direction or the other. In the position shown in Fig. 6 the fluid enters the valve chamber through the port 63 and passes through a port 67 and a check valve comprising a spring pressed ball 68 to the pipe 69 which communicates with a pipe 70 extending approximately from end to end of the machine and provided with branches 71 and 75 communicating respectively with passages 76 extending through the spindles 48 to the cylinders 59 whereby the levers 53 are actuated to hold the cranks in place. In the opposite extreme position of the lever 66 the piston 64 is positioned to cut off the flow of pressure fluid through the valve body. At this time the exhaust port 74 is opened permitting the pressure fluid in the pipe 69 and passages 75 and 76 to escape through port 77 and pipe 78 back to the supply tank from which it is constantly drawn so long as the machine is in operation by a pump hereinafter described. The return of the fluid and the unclamping of the cranks is assisted by the action of springs 60. The ball check valve 68 serves as a safety device in this connection in that it retains the pressure in the cylinder even though there should be failure in the pump or in the supply line and holds the cranks securely clamped until the lever 66 is moved to the left to such an extent as to reverse the valve 64.

Figure 12:
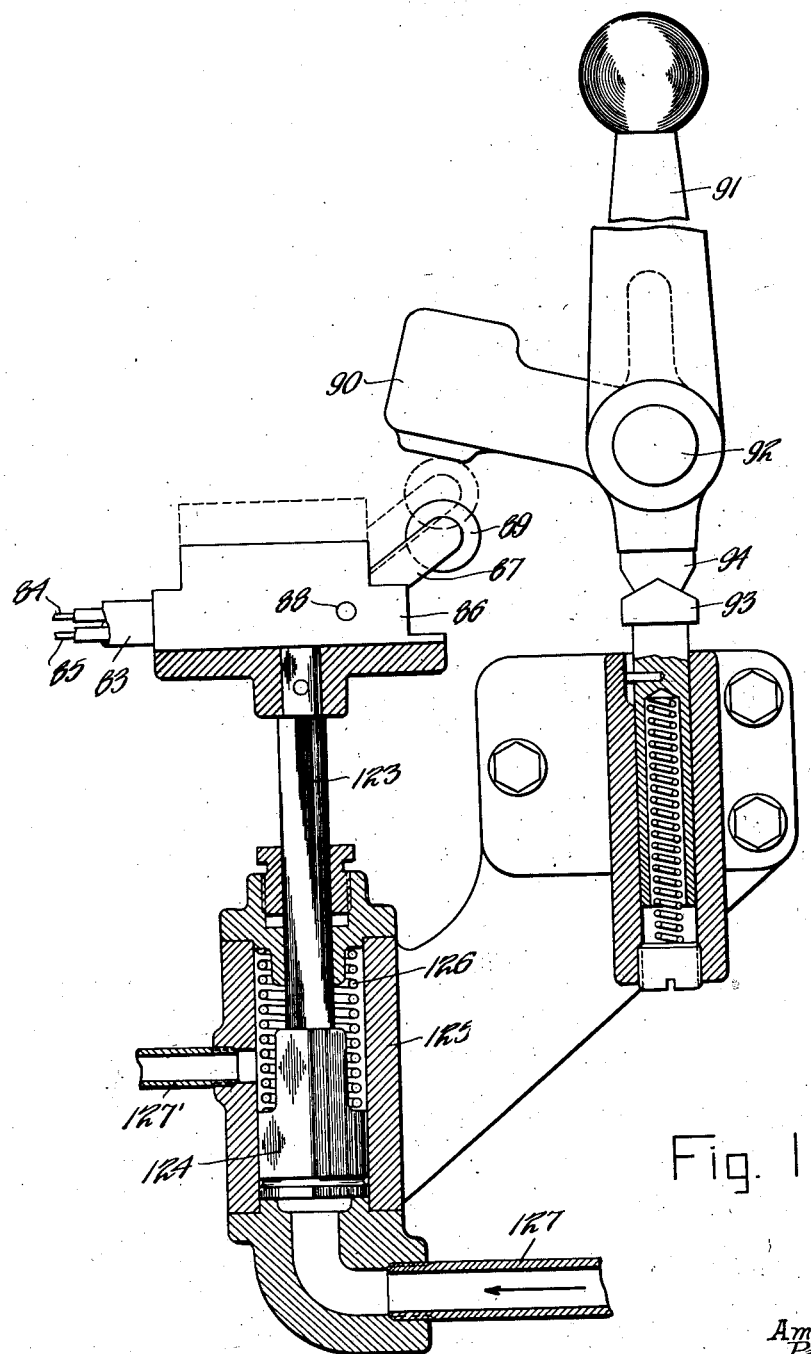

The spindles 48 are rotated by gearing of any suitable type connecting them to a shaft 79 extending over the table and journaled in bearings on the crank-heads, as indicated in Fig. 1. The shaft, as indicated at the left-hand side of Figure 1, is driven from an electric motor 80 by means of worm gearing of any desirable or conventional character and the operation of the motor is controlled by an automatic electric controller 81 connected to the motor by conductors in a conduit 82. Another conduit 83 contains conductors 84 and 85 leading to a control switch 86 provided with a switch lever 87 pivoted at 88. A roller 89 on the lever 87 is arranged for engagement by a switch-actuating arm 90 on a bent hand lever 91 pivoted at 92. This lever operates the switch to start and stop the driving motor, thereby starting and stopping the rotation of the work. The hand lever 91 is normally held in the position shown in Fig. 12 by means of a spring-pressed V-shaped detent 93 engaging a notch in the W-shaped lug 94 projecting downward from the lever. The four inclined faces on the lug coact with the two on the detent to lock the lever in any one of three positions, i. e. the central position where both the work and the traverse are stopped, a position to the left of that shown in Fig. 12, wherein the work is rotated while the carriage stands still, and a position to the right of that shown wherein the carriage is traversed while the work stands still. (See Figs. 1, 11 and 12.)

It is necessary to make provision at the junction of the stationary end of a branch pipe 75 and the corresponding end of the adjacent rotating spindle 48 to prevent loss of pressure fluid. For this purpose we provide a hardened stationary sleeve 95 secured in any convenient manner to an elbow 96 forming the end of the branch pipe 75. The sleeve 95 has a spherical seat held against a corresponding seat in a bushing 97 revolving with the spindle 48. The seats are forced together by pressure of the fluid so as to act effectively for preventing a leak. A packing gland at 98 serves as additional retaining means. The work rotating means just described forms the subject matter of a divisional application of Amos P. Steiner, Serial No. 282,173, filed June 1, 1928, for work clamping fixtures for crank grinding machines.

Work carriage traverse

Suitable guides 99 are provided on the frame 40 of the machine for guiding the work carriage 41 in its traveling or traverse movement whereby the work 46 is moved lengthwise of the machine to bring successive cranks into operative relation with the grinding wheel 43. For traversing the work a rack 100 (Figs. 13, 14 and 15) is secured to the underside of the carriage 41. The hydraulic motor 102 is secured to the front wall of the bed 40, and supported in the rear by the shaft 101. A sleeve 103 which is secured to the blade 131 (Fig. 8) is also secured to the gear wheel 103' which actuates the rack 100.

The motor is operated by fluid pressure supplied by a pump in a casing 104 (Fig. 11) through pipes 105 and 106 to a valve bracket 107 in which a balanced piston valve 108 is slidably supported. The valve has a stem projecting from the casing on which is a spool 109 connecting the valve to a rockarm 110 on a rockshaft 11. A hand lever 112 at the front of the bed 40 is also supported on said shaft and serves to move the valve in either direction from the neutral position illustrated in Fig. 8 against the tension of one or the other of the springs 113 and 114 which act equally against the piston but in opposite directions, so as to hold it in the position shown where no fluid is admitted to the motor to move it in either direction. A spring-pressed detent 114' movable with lever 112 and rockarm 110 acts on a V-shaped lug 115' on the bed to help center the valve 108. A throttle valve 115 is interposed in the passage from the pump to the valve casing, adjustment of the throttle valve controlling the speed of reciprocation of the work carriage. An overflow pipe 116 is connected to the fluid passage and is provided with a relief valve 117 by which the pressure is held down to a certain point, the overflow from the relief valve being discharged through the pipe 116 back to the storage tank. A pipe 118 also leads back to the storage tank and this pipe is provided with a "start and stop" valve 119 which when opened permits all the pressure fluid to escape back to said tank so as to intermit operation of the carriage traverse. When the valve 119 is closed the pressure is retained subject to the relief valve 117 and the throttle valve 115. When the valve 119 is open the pump runs idle, i. e. does not work against pressure thereby reducing wear and preventing useless expenditure of power.

A rockarm 120 on the valve 119 is connected by a link 121 to a rockarm 122 on a shaft 92 which carries a hand lever 91 at the front of the machine (Fig. 1) by which the work rotating motor 80 is controlled.

The switch 86 is supported on a rod 123 rising from a piston 124 mounted for vertical sliding movement in a cylinder 125. A spring 126 acts to force the piston downward and a conduit 127 supplies fluid under pressure to the cylinder for raising the switch into the dotted line position indicated in Figure 12 which is the operative position where movement of the lever 91 can close the switch for starting the motor 80 and rotating the work. A pipe 127 is connected to the pipe 69 (Fig. 1) for conducting fluid pressure to the cylinder 125. A drainpipe 127' serves to carry off any fluid that may leak past the piston 124. It will be seen from this that there is an interlocking connection between the crankshaft rotating means and the carriage traversing means whereby the circuit for the work rotating motor is broken whenever the carriage traversing fluid motor is in action, the lever 91 being then in a position to the right of that shown in Fig. 12 thereby stopping the rotation of the work. The power is cut off from the traversing motor 102 by the movement of the lever 91 into the position shown in Figure 12 before the circuit can be closed to start the work rotating motor. On crank grinding machines heretofore known in the art there has been danger of serious damage in that the traverse might be started while the work is revolving or the work-rotating motor might be started while the work is traveling, due to inadvertence or carelessness on the part of the operator. Such damage is avoided by the use of the mechanism of the present invention.

It will also be seen that the work rotating motor 80 can operate only when the pressure is turned on in that part of the system which operates the crank clamping means so that the crankshaft is properly held in place by clamping fixtures, for the reason that the circuit, as above pointed out, can be closed only when the switch 87 is in the upper dotted line position. This position is assumed, of course, only when this part of the system is under fluid pressure, the pipe 127 being in communication with the pipe 69, as shown in Figure 1.

It being assumed that the valve 119 is closed and the throttle valve adjusted, the rockarm 112 and the valve 108 may now be moved, for example, to the left. Pressure from the pipe 106 will now pass through port 128 into the valve chamber and then through passage 129 into the space between the next partition 130 of the motor 102 and the movable blade 131 on the sleeve 103 which is connected to the gear 103' and will be rotated to move the carriage to the right. For moving the carriage in the opposite direction the lever 112 is moved to the right so as to move the valve to the other end of its chamber and open a passage through pipe 106, port 128 and passage 132 to the other side of the partition 130 whereupon the blade 131 will be moved counter-clockwise and the carriage will move to the left.

It will be obvious that the speed of the table may be varied by moving the lever to greater or less distance from its central position, the speed increasing as the lever is moved further from such position, and reaching a maximum when either the passages 129, 132 is fully open to permit a maximum flow of pressure fluid. This feature is of great advantage in grinding cranks for the reason that the highest rate of travel may be very rapid and the carriage can travel at high speed from grinding position for one crank-pin to grinding position for the next. As it approaches such position the lever 112 can be moved back toward central position to slow up the carriage. As soon as the operator removes his hand from the lever it will return to central position due to the action of springs 113 and 114 thereby stopping the carriage whether it is in correct grinding position or not.

When the fluid is entering the motor chamber through one of the passages 129 and 132 it is being exhausted through the other, the fluid passing from the then exhaust passage 129 or 132 through the corresponding end of the motor chamber, the exhaust port 133 and the exhaust pipe 134 back to the tank.

The machine is provided with means for limiting the traverse of the carriage such means being shown best in Figs. 2, 13, 14, 15 and 32.

A shaft 135 extending lengthwise of the machine is supported in bearings on the bed 40 and is provided at intervals along its length with stops arranged in sets indicated respectively at 136, 137 and 138, these sets corresponding to the spacing between different cranks in the same plane. The stops are secured to the shaft 135 at approximately the proper position for the crank pins of the crank and each stop has an adjusting screw 139 providing for closer adjustment.

A beveled gear 140 is mounted on the shaft 135 at one end thereof and said gear meshes with a beveled gear 141 on a cross shaft 142 at the front of the machine with a handle 143 having a spring-pressed pin 144 for engagement with any one of a series of holes 145 in a plane face on the frame just back of the handle. These holes are spaced at such a distance from each other and the ratio of the beveled gears is so selected that movement of the shaft 142 from one hole to another will turn the shaft 135 to move one set of stops out of engaging position relatively to the rack 100 and bring another set into engaging position.

It will be understood that by moving the handle 143 shaft 135 can be turned to bring the adjusting screws on any one of the three sets of stops into the path of movement of the rack 100 and thus stop the travel of the carriage when the rack strikes the adjusting screw. It will be understood that two of these adjusting screws will be substantially in alinement at opposite ends of the rack while the stops of the other sets are out of the way so that they cannot interfere with the control of the carriage by the particular set which is in use.

Figure 13:
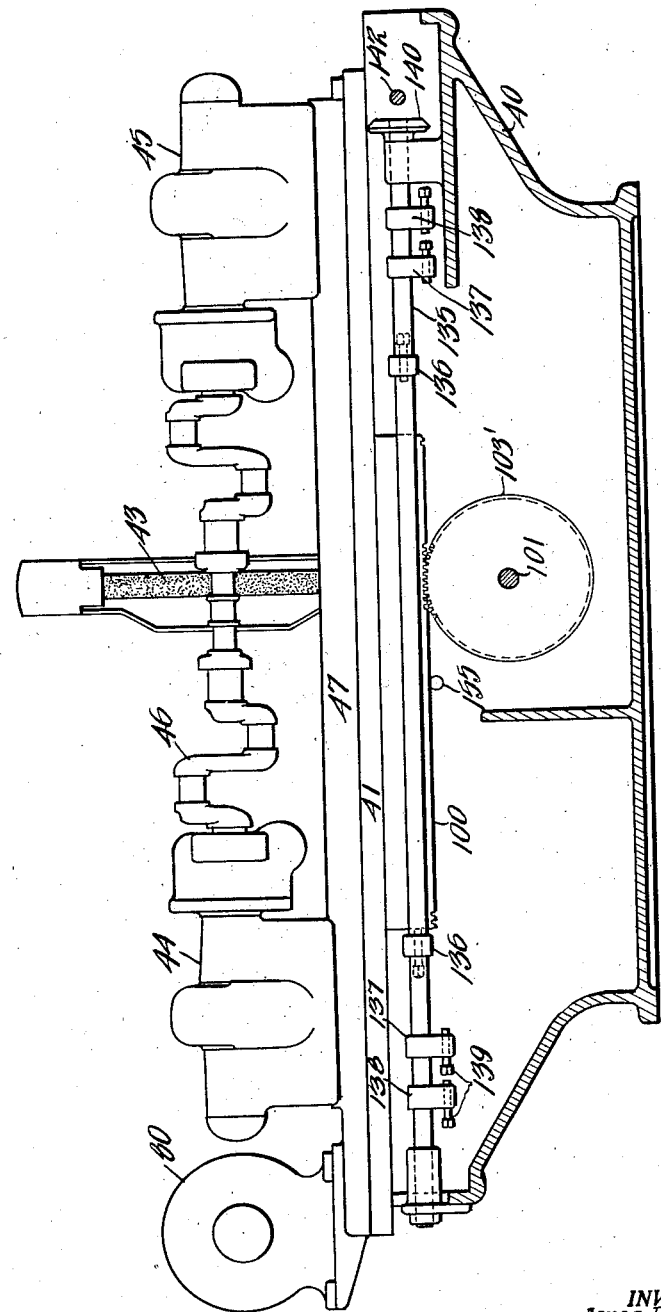
Figure 14:
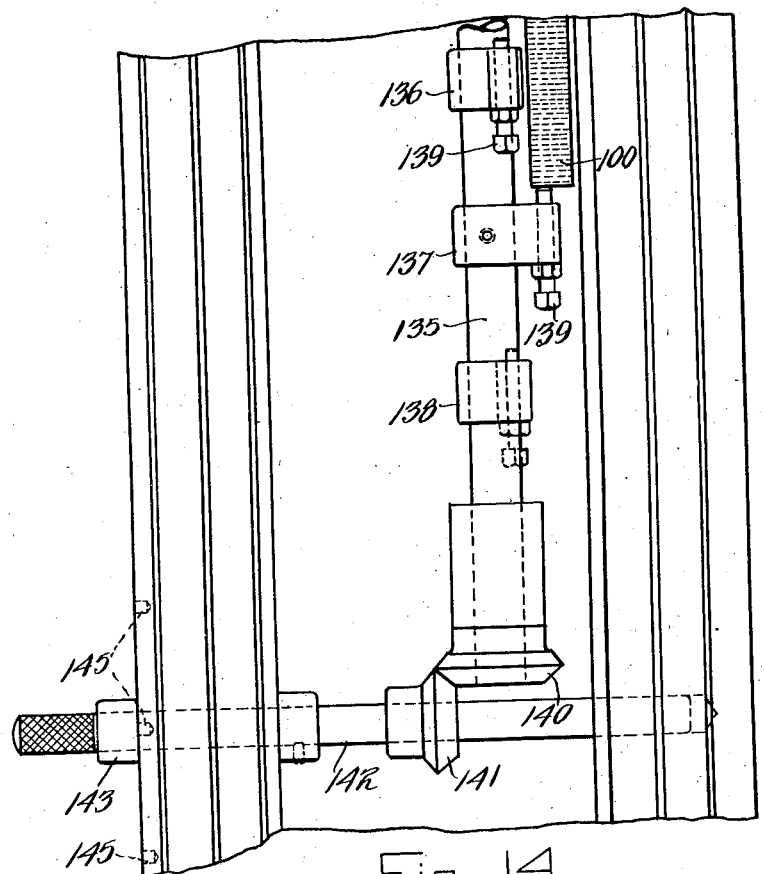
Figure 15:
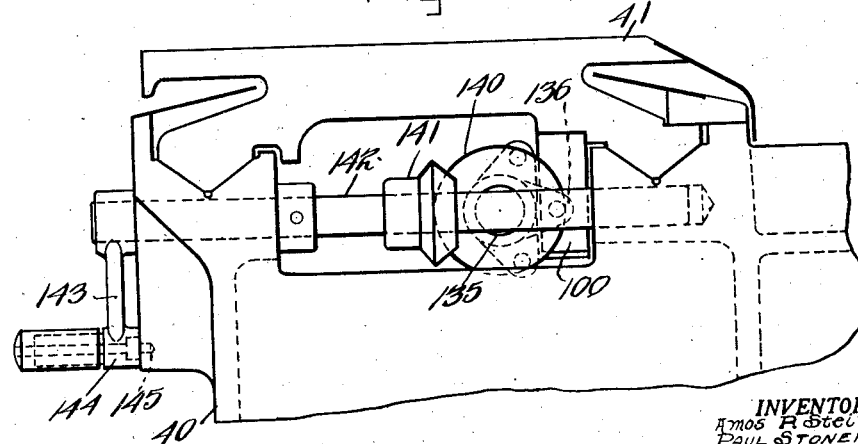

In the arrangement shown in the drawings a six cylinder three-throw crank is shown in position to be operated on. In Fig. 13 the two innermost stops are in rack engaging position so as to position the innermost crankpins with reference to the grinding wheel, these crankpins being commonly known as pin No. 3 and pin No. 4. Figures 14 and 15 show the stops in position to grind crankpins Nos. 2 and 5 and it will be clear from these figures in connection with Fig. 32 how the rack strikes the stops of one set and clears those of the others.

*Work traverse—manual*

Figure 10:
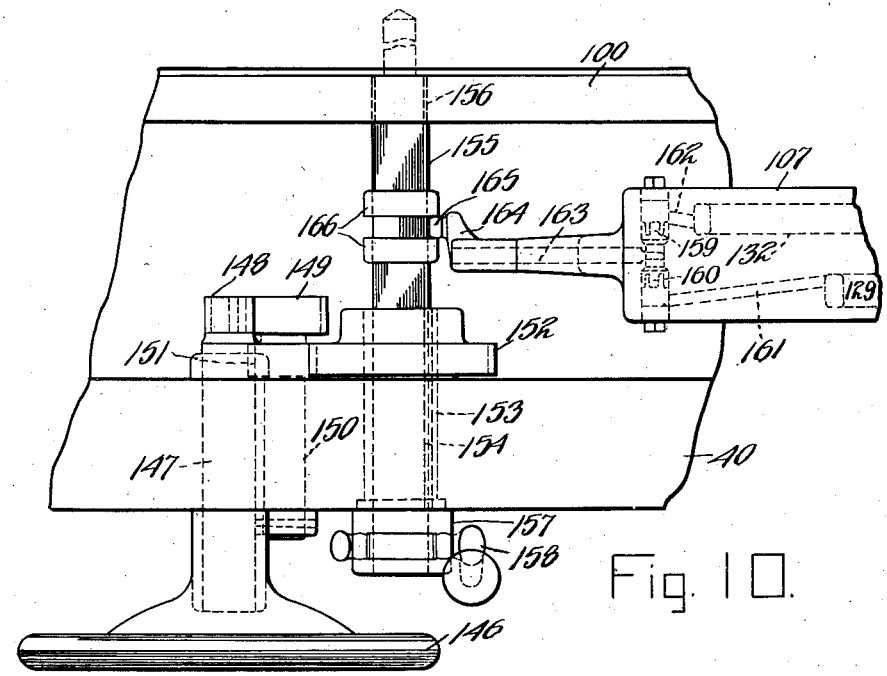
Figure 9:
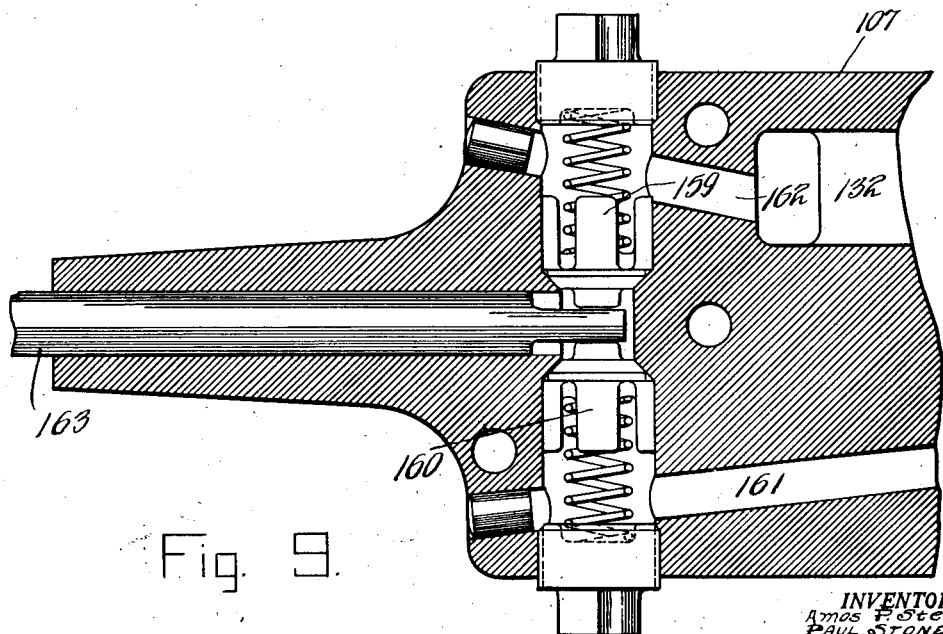

The hand operating means for traversing the carriage is best shown in Figures 8, 9, 10. Such means comprises a hand wheel 146 (Figs. 1, 2 and 10) on a shaft 147 (Figure 10) said shaft being mounted on the bed 40. The shaft 147 carries a pinion 148 engaging the gear 149 on another shaft 150 journaled in said bed. The shaft 150 carries a pinion 151 meshing with a gear 152 on a sleeve 153 having its bearing in said bed and connected by a spline 154 to a shaft 155 which rotates with the sleeve but is slidable lengthwise through the sleeve to cause its pinion 156 to engage with the rack 100 or to be disengaged therefrom when the manual traverse is disconnected. The further end of the shaft 155 is reduced in size and extends into a bearing in the bed 40 in which bearing it is free to revolve. The outer end of the shaft 155 carries a spool 157, the groove of which is engaged by rollers on a yoke formed in a lever 158 (Figs. 1 and 10). The lever 158 being pushed forward into the position indicated in Fig. 10 whereby the pinion 156 is caused to engage with rack 100 and thus connect the hand wheel 146 to the carriage for manual traverse of the same, the carriage would still be locked in position by the fluid in the traverse motor if no means were provided for permitting such fluid to escape. With this object in view a by-pass is formed in the valve bracket 107 connecting the passages 129 and 132 to one another so that upon manual operation of the carriage the fluid in the motor may pass from one side of the partition 130 through the passages 129 and 132, or vice versa, to the other side of the partition so as to offer little or no resistance to the movement of the motor by means of the hand-wheel 146. This by-pass comprises a valve chamber in which are located oppositely-movable spring-pressed valves 159 and 160, with passages 161 and 162 leading respectively to the passages 129 or 132.

For opening the valves to permit the fluid to by-pass from one side of the motor to the other there is provided a rockshaft 163 having a flattened end located between faces on the valves 159 and 160. The shaft has at the other end a rockarm 164 carrying a roller 165 located between a pair of fixed collars 166 on the shaft 155.

It will be seen from the foregoing that when the carriage is to be traversed manually the lever 158 will be actuated to engage the pinion 156 with the rack 100. The longitudinal movement of the shaft 155 will act through collars 166, rockarm 164, etc. to open the valves 159, 160 and to by-pass the fluid through the motor so that the carriage will not be locked by the fluid in the motor. This is also a measure of safety in that it will be impossible to cause the carriage to traverse under power while the parts are in position for manual operation, the fluid merely passing through the motor and out by way of the exhaust pipe 134. This obviates danger of accidents to workmen repairing the machine, etc.

*Wheel feed*

The grinding wheel 43 is mounted on a spindle 167 carried by a wheel base 168 (Figs. 2, 16, 18, 20, 22 and 24). The wheel base 168 is mounted in suitable guides 169 on a slide 170 and the slide 170 is similarly guided for reciprocation in suitable guides 171 on the slide base 172. The wheel base is fed along the slide 170 for locating it according to the diameter of the work and in order to make adjustment for wear of the grinding wheel, by means comprising a pinion 173 on a vertical shaft 174 in the wheel base. The shaft is geared at its upper end to a horizontal shaft bearing a hand-wheel 175 (Figs. 1 and 2) by means of which pinion 173 is rotated. Said pinion has teeth meshing with those of a rack 176 on the side 170 for moving the wheel base relatively thereto.

The slide 170 is reciprocated on the slide base toward and from the work to carry the wheel into working position and back out of working position far enough to avoid any interference with the crankshaft as the carriage traverses from grinding position for one crankpin to grinding position for another. This movement of the slide is provided by means of a hydraulic motor 177 (Figs. 2 and 22) driving a pinion 178 (Figs. 2 and 16) which engages a rack 179 on the slide.

The motor is driven by pressure fluid supplied by a pump in the casing 104 through pipes 181 (Figs. 2 and 11) and 182 (Fig. 22) to either side of a blade 183 according to the position of a valve 184 manually controlled by a lever 185 engaging a spool 184' on the piston rod 212. The lever 185 has a forwardly extending arm 186 (Fig. 2) with a knob 187 on the forward end thereof for convenience in grasping the same. A valve 188 is located in the pipe 182 to control the speed of movement of the slide. An exhaust pipe 189 carries fluid back to the tank.

The forward movement of the slide is limited by a stop 190 striking a fixed part of the slide base 172 and the rearward movement is limited by an adjustable screw 191 in the path of movement of the rack 179, the adjustment of the screw varying the backward stroke of the slide.

It is desirable to have the wheel base retreat rapidly for which purpose the valve 184 is moved to its fullest extent in one direction. In similar manner the wheel base should advance rapidly until it nears the point where the grinding operations begin when it should slow down to a proper grinding speed for removing the excess metal from the crank pin.

For slowing down the forward movement of the wheel base a hydraulic feed regulator 192 including a piston is secured to the rear side of the slide base 172 and a co-acting cylinder 193 is slidably mounted on said piston, the cylinder being spring-pressed to move it lengthwise of the stationary piston and having its movement limited by an adjustable nut 194 on a stud 195. Before the depending flange of the slide 170 (as shown in Fig. 16) strikes against the adjustable stop 190 an abutment 196 strikes the movable cylinder 193 of the hydraulic feed regulator and checks the movement of the slide and therefore of the wheel base.

Automatic means are provided for maintaining the supply of liquid in the hydraulic feed regulator, such means comprising a reservoir 197 communicating with the hydraulic feed regulator cylinder by a pipe 198. A check valve 199 is located in said pipe and the suction caused by the pressure of the spring 200 pushing back the cylinder aids in drawing the liquid from the reservoir into the hydraulic feed regulator through the check valve. The wheel slide being moved forward by the hydraulic motor 177 causes the liquid in the hydraulic feed regulator to be discharged through a pipe 201 and a regulating valve 202 back to the reservoir. The adjustment of the regulating valve 202 (Figs. 18, 19, 20, 21) determines the speed of the wheel slide and wheel base during the grinding feed and the position of the nut determines the length of the grinding feed by determining the point at which the quick motion ends and the slow feed begins.

In order to render the regulating valve accessible to the operator and easy of adjustment it is mounted on the upwardly extending pipe 201 (Fig. 20) and a graduated dial 203 is secured to the valve casing. A shaft 204 extends forward over the wheel base 168 said shaft having a knob 205 (Figure 20) within easy reach of the operator. The shaft 204 carries a pointer 206 cooperating with the dial 203 to indicate the adjustment of the valve for regulating the wheel feed while grinding.

In addition to the manual controlling means for the wheel feed motor heretofore described an automatic controlling means is provided whereby the supply of pressure fluid to the motor is cut off as the wheel reaches grinding position, then the wheel is caused to remain in grinding position for a predetermined time to finish the crankpin, and then it is retracted from the work, the wheel base and slide being drawn back to the most remote position permitted by the adjustment of the screw 191.

Figure 23:
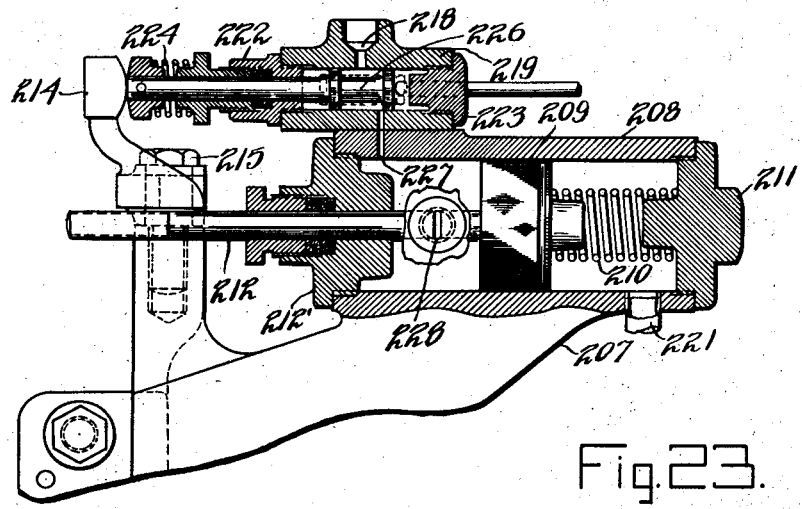

The automatic control comprises a valve bracket 207 (Figs. 22, 23, 24) secured to the wheel slide base 172. This bracket has a fixed cylinder 208 formed thereon. A piston 209 is mounted for reciprocation in the cylinder and is in line with, and connected to, the valve 184 for controlling the flow of fluid to one side or the other of the motor 177, the piston being movable to the left in Fig. 23 by a spring 210 bearing at one end against the piston and at the other end against a cylinder head 211. The stem 212 of the piston extends through another cylinder head 212' and connects with the spool 184' on the valve 184. An adjustable dog bracket 213 is secured to one side of the wheel slide 170 in a position to engage the shorter arm of a lever 214 pivoted at 215. As said dog travels toward the work with the wheel slide, it engages the lever 214 near the end of the grinding feed movement and regulates the duration of dwell, for finish grinding, and automatically retraces the wheel by means now to be described.

Figure 2:
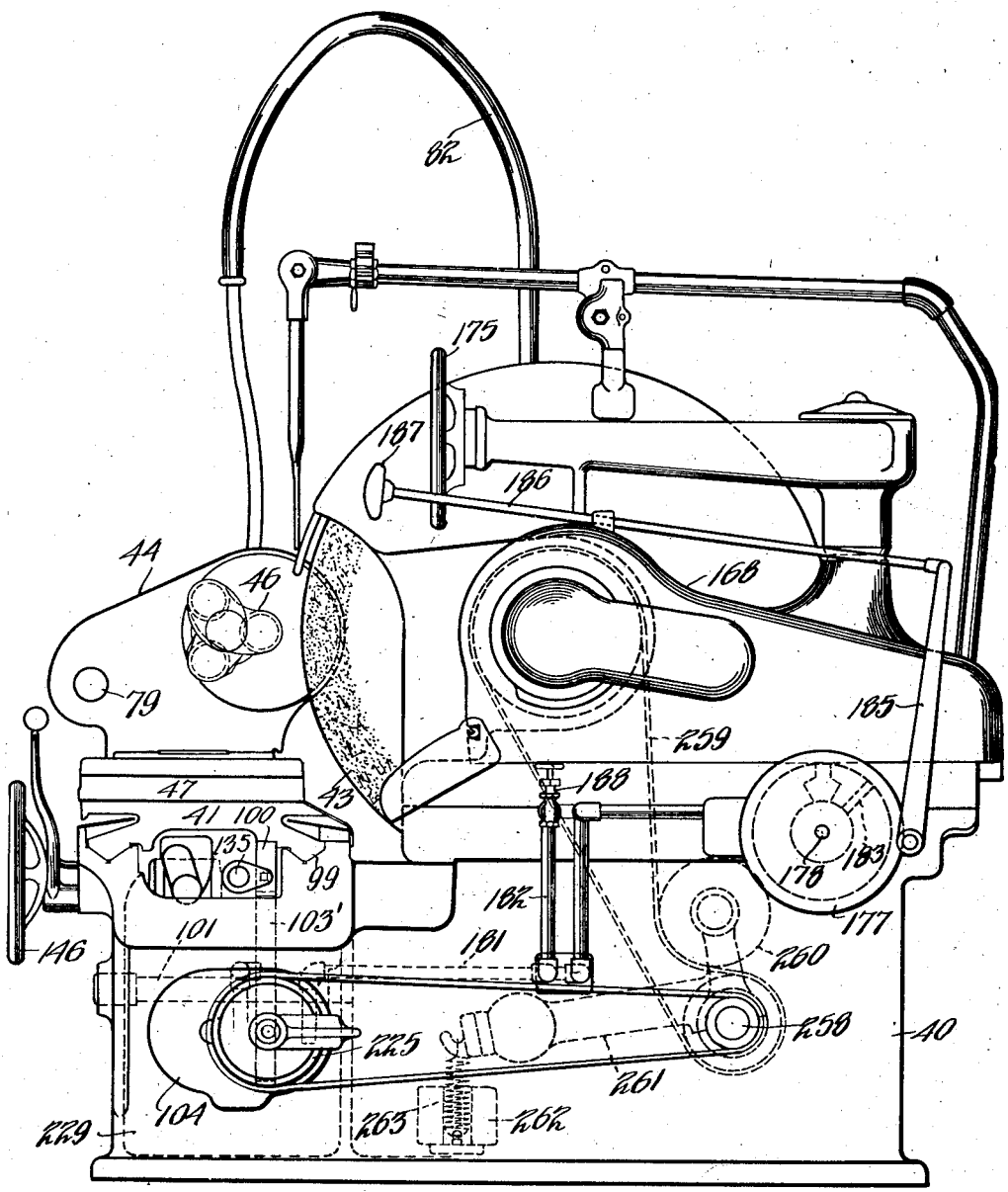
Figure 22:
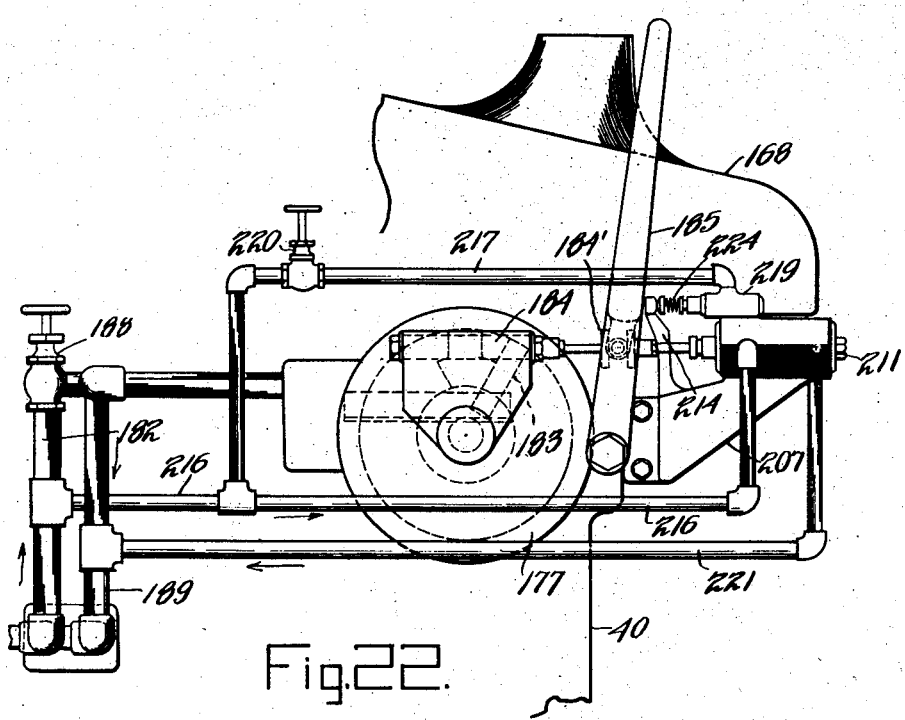
Figure 30:
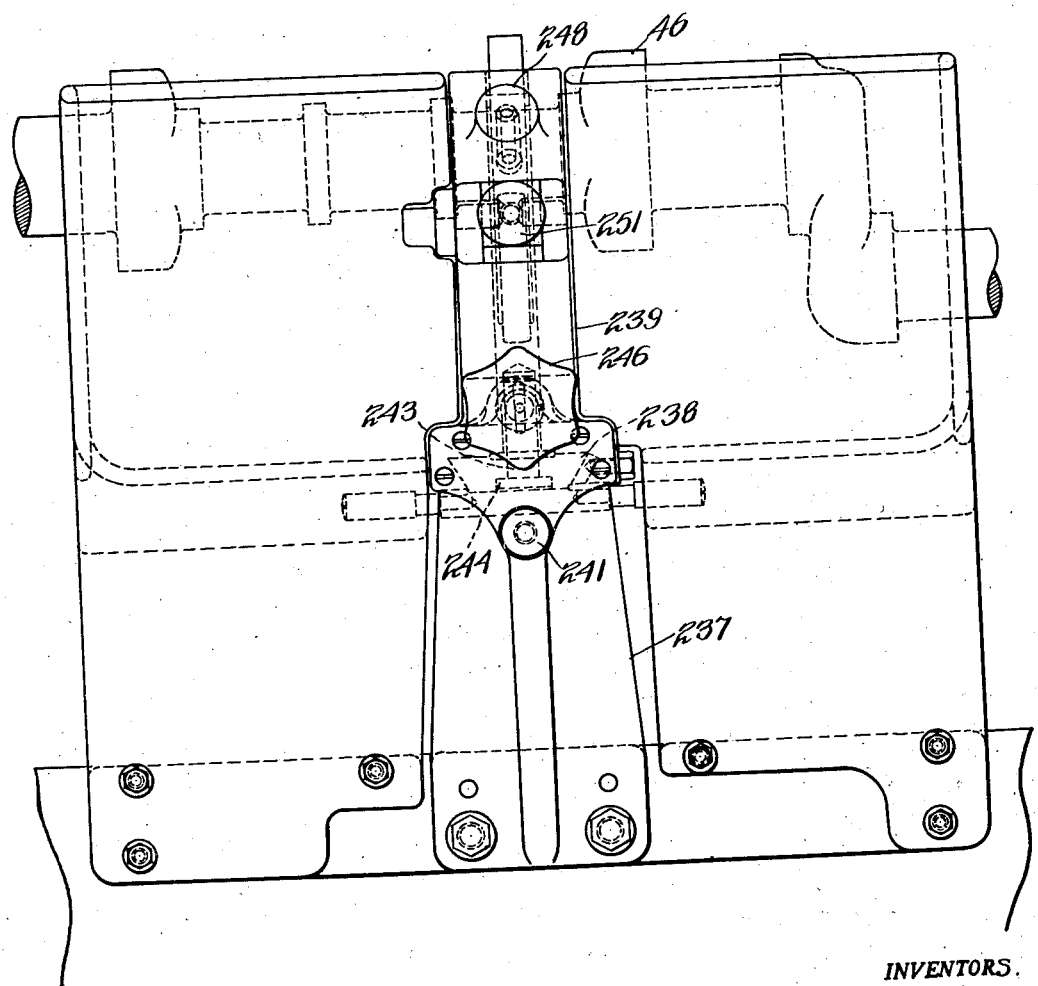
Figure 33:
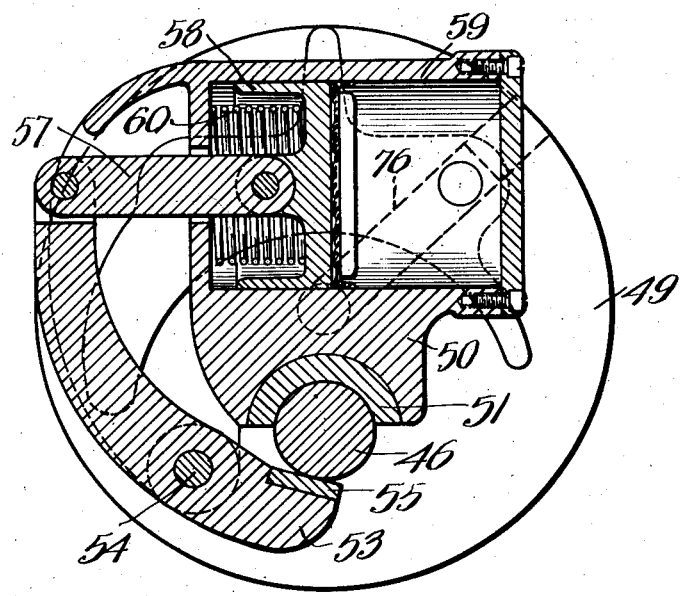
Figure 33 is a transverse sectional view of the work clamping fixture.
Figure 34:
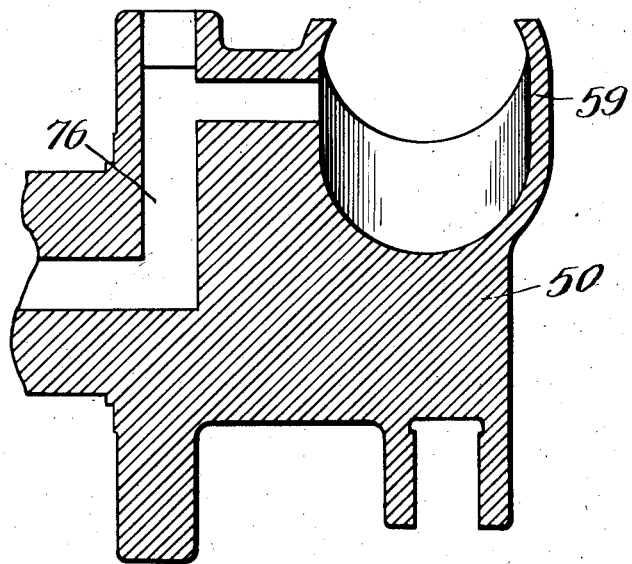
Figure 34 is a longitudinal sectional view of the work clamping fixture.

It will be recalled that the wheel slide motor 177 is supplied with pressure fluid by the pump 104 through pipes 181 and 182 (Figs. 2 and 22). Pressure fluid is supplied to the left-hand side of piston 209 by a pipe 216 having a branch 217 leading to a port 218 in the cylinder 219. A valve 220 controls the flow of the fluid to the upper cylinder. A return pipe 221 is connected to the outer end of the cylinder 208 and communicates at its other end with the return pipe 189 leading back to the tank. The flow of fluid through the cylinder 219 is controlled by a piston 226 whose movement in one direction is limited by a cylinder head 223. A spring 224 abutting against the cylinder head 222 serves to force the piston to the left (Fig. 23), such movement being limited by the lever 214.

As the wheel base 168 and the wheel base slide 170 approach the work their movement will be checked, as previously explained, by the hydraulic feed regulator shown in Fig. 19. At this time the spring 224 holds the piston 226 and the lever 214 in a position opposite to that shown in Figs. 23 and 24, i. e. as far to the left as possible thereby closing the port 227 leading from one cylinder into the other. When the dog 213 now strikes the lever 214 the spring 224 is compressed and the port 227 is uncovered so that pressure fluid may enter the cylinder 208 behind the piston 209. Thereupon the piston moves slowly toward the right, the speed being limited by the adjustment of the valve 220 until the port 228 of the pipe 216 begins to be uncovered when the added supply of fluid through the port 228 causes the piston to move quickly to the right until it strikes the boss on the cylinder head 211. At this point the lever 185 has been moved into its rearmost position (see Fig. 22) and the wheel feed motor 177 has been reversed by the valve 184 so that the wheel slide is now being moved back away from the work. The dwell of the grinding wheel in its forward position for finishing the work can be varied by adjustment of the valve 220 and the dog 213 can be adjusted to operate the valve 226 just as the wheel slide reaches the finished size of the work or sooner, as may be deemed desirable.

Pumps

Fluid pressure is supplied to the various fluid motors by the gear pump indicated generally at 104, this pump being so secured to the end of the bed 40 that the driving sprocket 225 is positioned outside the bed. The sprocket is driven by a chain shown in Fig. 2, while the pump extends alongside the reservoir 229 formed in the base of the machine. The driving shaft 230 upon which the sprocket is mounted extends through the pump and drives the same. The one casting or unit contains a pair of pumps simultaneously in action, the larger of these pumps comprising a pair of gears 232 furnishing pressure fluid through the pipe 105 to the driving motor for traversing the work carriage, as indicated in Fig. 11. The smaller pump comprises gears 233 supplying pressure fluid through pipes 181, 69 and 70 to the crankshaft clamping fixtures (Figs. 3, 5, 6) and to the wheel feed motor by pipes 181 and 182.

The duplex pump is preferred for use in this connection for the reason that the traverse drive requires at times a large quantity of fluid and at other times no pressure at all, whereas the crankshaft clamping devices and the wheel feed motor must be under pressure at all times though their requirements are relatively small. The gears 232 of the traverse motor pump run constantly while the cranks are being ground, no pressure being, however, exerted on the carriage driving motor except when the carriage is to be traversed for the reason that at other times the valve 119 in Fig. 11 is open to permit the fluid pressure to escape. The two pumps of the unit have a common suction pipe 234. The pump unit as well as the operating valves in the motor for causing traverse of the carriage are all located over the reservoir 229 in the bed 40 so that any leakage of fluid will be returned to the reservoir.

A pressure tank 235 is so located as to be in communication at its lower end with the pipe 233 that supplies fluid from the pipe 181 to the crankshaft clamping devices and to the wheel feed motor. A check valve 236 is placed in the pipe line ahead of the pressure tank 235 to retain the fluid and prevent its escape. Air is trapped in the upper part of the pressure tank and forms a resilient cushion. When now the pressure fluid is forced into the tank the air is compressed and maintains an even pressure on the crankshaft clamping devices even though the wheel feed motor 177 should draw heavily on the supply at times and lower the pressure in the supply line.

Work rest

The work rest (Figs. 27, 28, 29, 30) comprises a base 237 secured to the bed 40 and extending upward and rearward over the work carriage 41 and the table 47, said work rest comprising means for supporting the crankshaft 46 at a point directly in front of the grinding wheel 43. The base 237 has suitable guides 238 supporting a body 239. The body 239 is slidably mounted in said guides so that the work rest may be withdrawn quickly to clear the crankshaft 46 when the work carriage is to be traversed for bringing a different crankpin in front of the grinding wheel.

The base 237 is provided with a hardened stop 240 against which an adjustable stop 241 strikes, said stop 241 being adjustably secured to a bracket 242 fixed to the body 239. A clamping bolt 243 projects upward into the body said bolt having a flattened head formed thereon to engage a T-slot at 244 in the base 237. The clamping bolt has a conical indentation at the front side for engagement by a conical point on a clamping screw 245 having threads engaging threads in the base and having a knob 246 for manual operation whereby the clamping screw lifts the clamping bolt and secures the body 239 to the base 237 in any desirable position of adjustment.

The work rest is provided with an upper jaw 247 supporting the work 46 directly from the rear said jaw being adjustable by a screw 248 carrying a positioning nut 249 for limiting its adjustment. A lower jaw 250 is pivotally mounted on the work rest in position to engage the underside of the crank. This jaw is adjustable by means of the screw 251 bearing against the curved inclined rear end 252 of the lower jaw 250. Movement of the adjusting screw is limited by a positioning nut 249 clamped thereon. The nut 253 is pivotally mounted in the body 239 on fulcrum pins 254 (Fig. 28). A spring-pressed detent in the form of a plunger 255 serves to hold the lower jaw in operating position. With this construction of the lower jaw it is possible to drop such jaw quickly away from the crank for the purpose of measuring the same with a micrometer or other gaging device. The jaw can then be returned to position by lifting the outer end of the screw 251 so as to force the inner end down the curved incline 252 and move the jaw to working position, all without disturbing the setting of the adjusting screw 251 or the nut 249. By means of this back rest all the pins on a crankshaft may be ground without changing the set-up of the machine. By a change in the set-up is meant any change in the relative location of the fixtures or tool on the machine. Removal of the work from the machine for example, is not considered a change in the set-up. The withdrawal of the back rest consists in moving the back rest out of operative position, without removing it from the machine.

The plunger 255 which holds the lower jaw in place may be disengaged by depressing the outer end of a lever 256 thereby causing it to lift the plunger. A spring 257 tends to move the plunger back to operative position.

Wheel drive

The grinding wheel is driven from the main drive shaft 258 (Fig. 2) by a belt 259. An idler pulley 260 serves to maintain even tension on the driving belt. The idler is pivotally supported by a rockarm extending upward from the main driving shaft, said arm being integral with or fixed to a laterally extending arm 261 from which a weight 262 is suspended by a spring 263. The spring absorbs any unevenness in the belt which might cause the idler to vibrate and the weight exerts an even pull on the spring and hence on the rockarm.

Among other advantages of our device may be mentioned the fact that the work rest is located on the body directly in front of the grinding wheel at all times with means whereby the rest may be moved quickly out of operating position far enough to provide sufficient clearance for any pin or projection on the crankshaft so that the work carriage may be moved from a position for grinding one crankshaft into a position for grinding another without any interference from the work rest. This arrangement also renders it easy to change cranks. When the traverse has been completed or the work has been changed, the workrest which has been slid directly backward can be slid quickly back to place and can then be securely fixed in operating position without disturbing any stops thus effecting a great saving of time. In machines of this character heretofore in use the work rests have been secured to the worktable in such a manner that it was necessary to remove them prior to changing from one crankpin to another or prior to changing work and thereafter to re-position the rest on the worktable. By doing away with such cumbersome arrangement a great saving of time is effected.

In our arrangement the base 237 rests at its forward end on the table 47 when the work is being supported by the rest thus forming a solid unyielding support; when the rest, however, is withdrawn from the work and is free from load the table is also free to travel under the rest with a minimum of friction and a minimum of wear on the supporting bearing for said table.

Operation

In the operation of our device, it being assumed that the work carriage is at one end of its traverse, the crank-clamping chucks are open and the wheel carriage is in retracted position, a crankshaft is now placed in clamping position relatively to the chucks and the lever 66 is moved from inoperative position into the position illustrated in Fig. 6 so that fluid under pressure passes through port 67 and passage 74 into pipe 69, then through pipes 70 and 75 and through the spindles 48 to the cylinders 59 to actuate the pistons 58 and cause the crankshaft to be firmly clamped in both chucks. The pipe 69 has a branch 127 leading to the cylinder 125 (Fig. 12) for lifting the piston 124 to bring the switch lever 87 into working position relatively to arm 90 of hand lever 91. The arm 90 may now be moved counterclockwise in Fig. 12 to close the circuit through the work rotating motor and so start the motor.

It is now necessary to return the wheel to operative position relative to the work and this is done by the workman who grasps the knob 187 and pulls it toward him whereupon the wheel base and wheel slide move rapidly forward until checked by the hydraulic feed regulator (Figs. 18 and 19). Thereafter the wheel supporting means will move forward at grinding speed, making contact with a crank and grinding it down to the required size. As the crank attains the correct size the dog 213 strikes the lever 214 and moves the balanced piston 226 into the position shown in Fig. 23 so as to open the passage 227 and admit fluid under pressure to the cylinder 208. The piston 209 will now be forced slowly over to the right until it passes the port of pipe 216 after which it will be moved rapidly and so drag the lever 185 quickly into reversing position whereupon the wheel supporting devices will be moved back after the work is finished into their rearmost position out of the way of the cranks on the crankshaft 46.

One crank having been finished the work carriage is now to be moved into position to bring the next crank in the same plane into operative relation relative to the wheel. For this purpose the hand lever 91 is moved from the position shown in Fig. 12 clockwise into a position where the face 94 will contact with the left-hand face of plunger 93. In connection with such movement the hand lever 91 and the rock-arm 122 (Fig. 11) will pass through the neutral position of Fig. 12 where the switch arm 87 is permitted to break the motor circuit and stop the work and where the work carriage traverse is out of operation into a position where the rock-arm 120 is moved clockwise to such an extent as to close the valve 119 and cause the pressure fluid from pump gears 232 to operate the traverse motor shown in Fig. 8. The extent of movement of the work carriage is predetermined by adjustment of the crank 143 to bring one set of the stops shown in Fig. 13 into position to abut against the end of the rack 100 and stop the carriage with the next crank to be ground in operative position relatively to the wheel 43.

In some instances it is desirable to traverse the work carriage manually and in such cases the lever 158 (Fig. 1) is forced backward or away from the operator to move the shaft 155 in Fig. 10 so as to bring the pinion 156 into engagement with the rack and open the valves 159 and 160 to permit the fluid pressure to by-pass at this point and prevent any accidental operation of the power traversing means for the carriage. Thereupon the hand-wheel 146 may be rotated to move the work carriage at will.

The motor for operating the wheel feed is normally out of operation as above explained and therefore the wheel adjusting devices may be operated manually, as to compensate for wear, without any special precautions it being only necessary to rotate the wheel 175 (Fig. 1) which turns the horizontal shaft geared to the shaft 174 (Fig. 16) and moves the wheel base 168 as desired.

It will be obvious to those skilled in the art that various changes may be made in our device without departing from the spirit of the invention and therefore we do not limit ourselves to what is shown in the drawings and described in the specification but only as indicated in the appended claims.

Having thus fully described our said invention, what we claim as new and desire to secure by Letters Patent, is:

1. A crank grinding machine comprising a grinding wheel, a work carriage, fluid-operated crankshaft clamping means thereon, fluid-operated means for causing relative axial movement of said wheel and said work carriage to bring successive cranks in the same plane into operative relation to said wheel a manually operable lever for controlling said fluid operated means, the said lever being biased to return to inoperative position when released by the operator, substantially as set forth.

2. A grinding machine comprising a grinding wheel, work-supporting means, a traversing carriage for one of such devices, a hydraulic motor for reciprocating the carriage, manual means for reciprocating the carriage, and a fluid by-pass for relieving the fluid pressure in said motor when operating the carriage manually, substantially as set forth.

3. A grinding machine comprising a grinding wheel, work-supporting means, a traversing carriage for one of such devices, a hydraulic motor for driving the carriage, manual means for driving the carriage, means for placing the carriage under control of either said motor or said manual means, and interconnected means for by-passing the pressure fluid normally driving said motor, substantially as set forth.

4. A crank grinding machine comprising an abrading device, a work carriage, crank-clamping means on the carriage, a fluid pressure means for operating said clamping means, means for rotating the work including a motor, and means for rendering said motor inoperative when the fluid pressure is cut off from said fluid pressure means, substantially as set forth.

5. A crank grinding machine comprising an abrading device, a work carriage, crank-clamping means on the carriage, fluid pressure means for operating said clamping means, means for rotating the work including an electric motor, a circuit-closer in the circuit of the motor, and means connected with said fluid pressure means for rendering the circuit-closer inoperative when the fluid pressure is cut off, substantially as set forth.

6. A crank grinding machine comprising an abrading device, a work carriage, crank-clamping means on the carriage, fluid pressure means for operating said clamping means, means for rotating the work including an electric motor, a circuit-closer in the circuit of said motor, a plunger carrying said circuit-closer, an actuating device for the circuit-closer normally out of operative relation thereto, and connections whereby the pressure fluid for actuating said clamping means brings the circuit-closer into operative relation with said actuating device when operating said clamping means, substantially as set forth.

7. A grinding machine comprising a work-holder, abrading means, a support for said abrading means, a fluid motor for moving the support toward and from the workholder, a hand lever connected to the motor to determine the direction of its movement, and fluid pressure operated means controlled by the position of the support for moving the lever in one direction, substantially as set forth.

8. In a grinding machine, a workholder, abrading means, a support for the abrading means, a fluid motor for moving the support toward and from the abrading means, a hand lever controlling the motor, fluid pressure operated means for moving said lever in a direction to withdraw the operating means from the work, and means operated automatically by the carriage at the forward part of its stroke for setting such fluid operated means in operation, substantially as set forth.

9. A device as in claim 8, with means for causing the support to dwell in its foremost working position, substantially as set forth.

10. In a grinding machine, a workholder, abrading means, a support therefor, a fluid motor for moving the support toward and from the abrading means, a hand lever controlling the motor, fluid operated means including a piston connected to the lever for moving the lever in a direction to cause retracting movement of the carriage, and fluid operated means controlled by the position of the carriage for giving an initial slow movement to said lever in such direction to cause a dwell in the carriage movement when in its foremost working position, substantially as set forth.

11. A grinding machine as in claim 10, with means for varying the period of such dwell, substantially as set forth.

12. A grinding machine comprising a workholder, grinding means, a support for said grinding means, fluid pressure operated means for moving the support away from the work at high speed, returning it at high speed, and then reducing the high speed to grinding speed as the support approaches grinding position, substantially as set forth.

13. In a grinding machine, a workholder, a grinding wheel, a support for said grinding wheel, fluid pressure operated means for moving the support at high speed toward grinding position, then reducing to grinding speed as the wheel approaches grinding position, then causing the support to dwell in its foremost grinding position for finishing the work, and then retracting the support at high speed, substantially as set forth.

14. In a grinding machine, a workholder, a grinding wheel, a support for said wheel, a fluid motor for moving said support at high speed toward and from the work, controlling means for reducing the movement of the support to a grinding speed as it approaches the work, and means for regulating the grinding speed, substantially as set forth.

15. A grinding machine comprising a workholder, a grinding wheel, a support for said wheel, means for moving the support toward and from the work at high speed, and means for reducing such speed to grinding speed as the wheel approaches the work including a hydraulic feed regulator connected to said support, substantially as set forth.

16. A grinding machine comprising a workholder, a grinding wheel, a support for said wheel, means for moving the support toward and from the work at high speed, means for reducing such speed to grinding speed as the wheel approaches the work including a hydraulic feed regulator connected to said support, and means for regulating the grinding feed by controlling the movement of the fluid in the hydraulic feed regulator, substantially as set forth.

17. A grinding machine comprising a workholder, an abrading device, a support for said device, means for moving the support toward and from the work at high speed, and means for reducing such speed to grinding speed as the abrading device approaches the work including a self-filling hydraulic feed regulator substantially as set forth.

18. A grinding machine comprising a workholder, abrading means, fluid pressure controlled work gripping means thereon, fluid pressure operated means for causing the workholder to move longitudinally to bring different cranks into operative position relatively to the abrading means, a support for said abrading means, fluid pressure operated means for moving the support toward and from the work, pumping means for supplying pressure to said different pressure operated devices, a single suction passage for said pumping means, and independent systems for distributing pressure to said devices, substantially as set forth.

19. A grinding machine comprising a workholder, abrading means, fluid pressure controlled work gripping means thereon, fluid pressure operated means for causing the workholder to move longitudinally to bring different cranks into operative position relatively to the abrading means, a support for said abrading means, fluid pressure operated means for moving the support toward and from the work, a plurality of pumps having a single suction passage, and independent systems for distribution of pressure from said pumps to the pressure operated devices, substantially as set forth.

20. A crank grinding machine comprising an abrading device, a work-carriage, crank-clamping means on the carriage, a fluid-pressure mechanism for operating said clamping means, means for imparting relative longitudinal movement to said abrading device and said carriage including a fluid motor, and interconnected means for supplying fluid under pressure simultaneously to said fluid-pressure mechanism and said motor, substantially as set forth.

21. A crank grinding machine comprising an abrading device, a work carriage, crank-clamping means on the carriage, a fluid-pressure mechanism for operating said clamping means, work rotating means, and means to render the work-rotating means inoperative when the pressure is cut off from the clamping mechanism, substantially as set forth.

22. A crank grinding machine comprising an abrading device, a work carriage, workholding means thereon, means for rotating the work, means for traversing the carriage to bring successive cranks into working relation with the abrading device, and interlocking means preventing simultaneous operation of the work-rotating means and the carriage-traversing means, substantially as set forth.

23. A crank grinding machine comprising a work carriage, a fluid motor for traversing the carriage, fluid-pressure actuated crank-clamping means on said carriage, work-rotating means on said carriage, interlocking means to prevent simultaneous operation of the work-carriage and the work rotating means, and means for causing traverse of the carriage irrespective of the operation of the crank-clamping means, substantially as set forth.

24. In a crank grinding machine means for grinding all of the pins on a given crank without moving the same from the machine comprising abrading means, work centering means, clamping means eccentric with respect to the work centering means, and work supporting means adapted to be withdrawn rapidly so as to clear the pins which are not in grinding position, substantially as set forth.

In witness whereof, we have hereunto set our hands at Waynesboro, Pennsylvania this 27th day of July, A. D. nineteen hundred and twenty-six.

AMOS P. STEINER.
PAUL STONER.
CHARLES P. HARRISON.